(12) United States Patent
Laliberte et al.

(10) Patent No.: US 12,105,756 B2
(45) Date of Patent: Oct. 1, 2024

(54) COMPUTER-IMPLEMENTED METHODS, SYSTEMS COMPRISING COMPUTER-READABLE MEDIA, AND ELECTRONIC DEVICES FOR NARRATIVE REPRESENTATION OF A NETWORK COMPUTING ENVIRONMENT

(71) Applicant: ClearVector, Inc., Reston, VA (US)

(72) Inventors: John N. Laliberte, Oakton, VA (US); Andrew Davis, Doylestown, PA (US)

(73) Assignee: ClearVector, Inc., Reston, VA (US)

( * ) Notice: Subject to any disclaimer, the term of this patent is extended or adjusted under 35 U.S.C. 154(b) by 0 days.

(21) Appl. No.: 18/312,346

(22) Filed: May 4, 2023

(65) Prior Publication Data
US 2023/0273958 A1    Aug. 31, 2023

Related U.S. Application Data

(63) Continuation-in-part of application No. 17/747,037, filed on May 18, 2022, which is a continuation of
(Continued)

(51) Int. Cl.
*G06F 16/901* (2019.01)
*G06F 3/0481* (2022.01)
(Continued)

(52) U.S. Cl.
CPC ........ *G06F 16/9024* (2019.01); *G06F 3/0481* (2013.01); *G06F 3/04842* (2013.01);
(Continued)

(58) Field of Classification Search
CPC .. G06F 40/134; G06F 16/3344; G06F 3/0481; G06F 3/04842; H04L 43/045
See application file for complete search history.

(56) References Cited

U.S. PATENT DOCUMENTS

| | | |
|---|---|---|
| 9,210,178 B1 | 12/2015 | Roth et al. |
| 10,432,669 B1 | 10/2019 | Badhwar et al. |
| (Continued) | | |

OTHER PUBLICATIONS

International Search Report and Written Opinion for PCT Application No. PCT/US2023/021059 (dated Jul. 26, 2023).
(Continued)

*Primary Examiner* — Andrea C Leggett
(74) *Attorney, Agent, or Firm* — Hovey Williams LLP

(57) ABSTRACT

A computer-implemented method for targeted narrative-structure representation of a network computing environment. The method may include: monitoring the network computing environment; obtaining, via the monitoring, data relating to an action performed in the network computing environment; selecting a first preference set from a plurality of preference sets, each of the preference sets corresponding to a respective one of a plurality of user roles and including a first structural narrative definition configured for the corresponding one of the user roles; generating a first natural language narrative describing the action based on the selected first preference set; and exposing or providing a representation of the first natural language narrative to an individual user assigned to a first user role of the user roles corresponding to the first preference set.

20 Claims, 10 Drawing Sheets

Related U.S. Application Data application No. 17/551,545, filed on Dec. 15, 2021, now Pat. No. 11,372,908.

(60) Provisional application No. 63/340,643, filed on May 11, 2022, provisional application No. 63/338,153, filed on May 4, 2022, provisional application No. 63/125,805, filed on Dec. 15, 2020, provisional application No. 63/125,812, filed on Dec. 15, 2020, provisional application No. 63/125,802, filed on Dec. 15, 2020, provisional application No. 63/125,799, filed on Dec. 15, 2020.

(51) Int. Cl.
| | |
|---|---|
| G06F 3/04842 | (2022.01) |
| G06F 9/54 | (2006.01) |
| G06F 16/25 | (2019.01) |
| G06F 16/28 | (2019.01) |
| G06F 16/33 | (2019.01) |
| G06F 40/134 | (2020.01) |
| G06N 20/00 | (2019.01) |
| H04L 9/40 | (2022.01) |
| H04L 41/0813 | (2022.01) |
| H04L 43/045 | (2022.01) |

(52) U.S. Cl.
CPC ............ *G06F 9/54* (2013.01); *G06F 16/258* (2019.01); *G06F 16/285* (2019.01); *G06F 16/288* (2019.01); *G06F 16/3344* (2019.01); *G06F 40/134* (2020.01); *G06N 20/00* (2019.01); *H04L 41/0813* (2013.01); *H04L 43/045* (2013.01); *H04L 63/08* (2013.01); *H04L 63/0884* (2013.01); *H04L 63/101* (2013.01); *H04L 63/102* (2013.01); *H04L 63/126* (2013.01); *H04L 63/1408* (2013.01); *H04L 63/1425* (2013.01); *H04L 63/168* (2013.01)

(56) References Cited

U.S. PATENT DOCUMENTS

| | | |
|---|---|---|
| 10,432,700 B2 | 10/2019 | Soni |
| 2002/0178223 A1 | 11/2002 | Bushkin |
| 2005/0172231 A1 | 8/2005 | Myers |
| 2007/0050191 A1 | 3/2007 | Weider et al. |
| 2011/0013569 A1 | 1/2011 | Scherzer et al. |
| 2011/0161419 A1 | 6/2011 | Chunilal |
| 2011/0246182 A1 | 10/2011 | Allen |
| 2012/0016678 A1 | 1/2012 | Gruber et al. |
| 2012/0078611 A1 | 3/2012 | Soltani et al. |
| 2013/0144605 A1 | 6/2013 | Brager et al. |
| 2013/0144606 A1 | 6/2013 | Birnbaum et al. |
| 2013/0174026 A1 | 7/2013 | Locke |
| 2013/0268260 A1 | 10/2013 | Lundberg et al. |
| 2014/0031114 A1 | 1/2014 | Davison et al. |
| 2014/0244400 A1 | 8/2014 | Benyamin et al. |
| 2015/0082432 A1 | 3/2015 | Eaton et al. |
| 2015/0331846 A1 | 11/2015 | Guggilla et al. |
| 2016/0269377 A1 | 9/2016 | Ylönen |
| 2017/0161242 A1 | 6/2017 | Clark et al. |
| 2017/0220669 A1 | 8/2017 | Wei |
| 2017/0293834 A1 | 10/2017 | Raison et al. |
| 2019/0026750 A1 | 1/2019 | Abdelsamie |
| 2019/0340518 A1 | 11/2019 | Merrill et al. |
| 2020/0035830 A1 | 1/2020 | Yu et al. |
| 2020/0054943 A1 | 2/2020 | Tamagawa |
| 2020/0104769 A1* | 4/2020 | Bnayahu ............... G16H 10/60 |
| 2020/0106790 A1 | 4/2020 | Bagnall et al. |
| 2020/0244696 A1 | 7/2020 | Thomas et al. |
| 2020/0285737 A1 | 9/2020 | Kraus et al. |
| 2020/0342465 A1 | 10/2020 | Ruddell et al. |
| 2020/0371780 A1 | 11/2020 | Sagy |
| 2020/0394204 A1* | 12/2020 | Nenninger ............. G06F 16/26 |
| 2020/0394273 A1* | 12/2020 | Trim ..................... G06N 5/025 |
| 2022/0035830 A1 | 2/2022 | Kim |
| 2022/0191211 A1 | 6/2022 | Laliberte |
| 2022/0277033 A1 | 9/2022 | Laliberte |
| 2023/0281249 A1 | 9/2023 | Laliberte |

OTHER PUBLICATIONS

International Search Report and Written Opinion for PCT Application No. PCT/US2023/021061 (dated Jul. 26, 2023).

Organization Science Article entitled Narrative Networks: Patterns of Technology and Organization by Brian T. Pentland (2007).

International Search Report and Written Opinion for PCT Application No. PCT/US2023/21861 (dated Aug. 4, 2023).

IBM Security QRadar Version 7.3.2, IBM Administration Guide (2019).

International Search Report and Written Opinion for PCT Application No. PCT/US2021/063582 (Mar. 2, 2022).

Office Action from U.S. Appl. No. 18/312,387 entitled Computer-Implemented Methods, Systems Comprising Computer-Readable Media, and Electronic Devices for Narrative Representation of a Network Computing Environment (Aug. 29, 2023).

Office Action from U.S. Appl. No. 17/551,605 entitled Computer-Implemented Methods, Systems Comprising Computer-Readable Media, and Electronic Devices for Resource Preservation and Intervention Within a Network Computing Environment (Dec. 19, 2023).

Office Action from U.S. Appl. No. 18/312,387 entitled Computer-Implemented Methods, Systems Comprising Computer-Readable Media, and Electronic Devices for Narrative Representation of a Network Computing Environment (Jan. 5, 2024).

Office Action from U.S. Appl. No. 18/315,815 entitled Computer-Implemented Methods, Systems Comprising Computer-Readable Media, and Electronic Devices for Enabled Intervention Into a Network Computer Environment (Sep. 14, 2023).

Office Action from U.S. Appl. No. 18/315,815 entitled Computer-Implemented Methods, Systems Comprising Computer-Readable Media, and Electronic Devices for Enabled Intervention Into a Network Computer Environment (Jan. 24, 2024).

Office Action from U.S. Appl. No. 17/747,037 entitled Computer-Implemented Methods, Systems Comprising Computer-Readable Media, and Electronic Devices for Narrative- Structured Representation of and Intervention Into a Network Computing Environment (Aug. 30, 2023).

Office Action from U.S. Appl. No. 17/747,037 entitled Computer-Implemented Methods, Systems Comprising Computer-Readable Media, and Electronic Devices for Narrative- Structured Representation of and Intervention Into a Network Computing Environment (Feb. 6, 2024).

\* cited by examiner

COMPUTER-IMPLEMENTED METHODS, SYSTEMS COMPRISING COMPUTER-READABLE MEDIA, AND ELECTRONIC DEVICES FOR NARRATIVE REPRESENTATION OF A NETWORK COMPUTING ENVIRONMENT

RELATED APPLICATIONS

This patent application: (A) is a continuation-in-part application of U.S. patent application Ser. No. 17/747,037, filed May 18, 2022, which, in turn, is a continuation of U.S. patent application Ser. No. 17/551,545, filed Dec. 15, 2021 (now U.S. Pat. No. 11,372,908), which, in turn, claims priority to the following U.S. patent applications: U.S. Patent Application No. 63/125,799, filed Dec. 15, 2020, and entitled SYSTEMS AND METHODS FOR UNDERSTANDING ACTIVITY; U.S. Patent Application No. 63/125,805, filed Dec. 15, 2020, and entitled SYSTEMS AND METHODS FOR NARRATIVE DRIVEN NAVIGATION, INVESTIGATION AND RESPONSE; U.S. Patent Application No. 63/125,802, filed Dec. 15, 2020, and entitled SYSTEMS AND METHODS FOR VERIFYING ACTIVITY; and U.S. Patent Application No. 63/125,812, filed Dec. 15, 2020, and entitled SYSTEMS AND METHODS FOR FORENSICS AND RESPONSE; and (B) additionally claims priority to U.S. Patent Application No. 63/338,153, filed May 4, 2022, and entitled SYSTEMS AND METHODS FOR SYNTHESIZING AND SUMMARIZING ACTIVITY, and U.S. Patent Application No. 63/340,643, filed May 11, 2022, and entitled SYSTEMS AND METHODS FOR SYNTHESIS AND USE OF DYNAMIC ENTITY PROFILES. The entire contents of each of the aforementioned patent applications is hereby incorporated herein by reference.

FIELD OF THE INVENTION

The present disclosure generally relates to computer-implemented methods, systems comprising computer-readable media, and electronic devices for narrative-structured representation of a network computing environment.

BACKGROUND

Existing methods for recording, representing, analyzing, and intervening in activity across a network computing environment typically involve presenting users with an interface for searching data associated with the environment. The interface enables users to perform searches for data expressly linked to keys such as filenames, IP addresses, hashes, alerts, or the like—primarily by visually presenting the search results to users as a table organized by one or more keys. However, existing methods for representing environments are primitive and fail to provide context useful for network monitoring and security efforts. Further, adjusting the interface and data representation to accommodate new data encountered in a new network computing environment and/or managing intervention(s) into such environments requires extensive and time-consuming manual efforts.

A more efficient and enriched method for monitoring and/or representation of a network computing environment is needed.

This background discussion is intended to provide information related to the present invention which is not necessarily prior art.

BRIEF SUMMARY

Embodiments of the present technology relate to computer-implemented methods, systems comprising computer-readable media, and electronic devices for narrative-structured representation of a network computing environment. Embodiments of the present invention include technological mechanisms for smooth, understandable viewing of portions and slivers of a production graph database model, and navigation between independent, manipulable natural language representations of those portions commensurate with varying levels of abstraction and detail relating to involved entities and activities. Embodiments also provide for improved control of system integrity and security, at least in part through provision of contextualized and actualized intervention means.

More particularly, in an aspect, a computer-implemented method for targeted narrative-structured representation of a network computing environment may be provided. The method may include: monitoring the network computing environment; obtaining, via the monitoring, data relating to an action performed in the network computing environment; selecting a first preference set from a plurality of preference sets, each of the preference sets corresponding to a respective structural narrative definition; generating a first natural language narrative describing the action based on a first structural narrative definition corresponding to the selected first preference set; and exposing or providing a representation of the first natural language narrative to an individual user assigned to the first preference set. The method may include additional, less, or alternate actions, including those discussed elsewhere herein.

Advantages of these and other embodiments will become more apparent to those skilled in the art from the following description of the exemplary embodiments which have been shown and described by way of illustration. As will be realized, the present embodiments described herein may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

Figure 7:
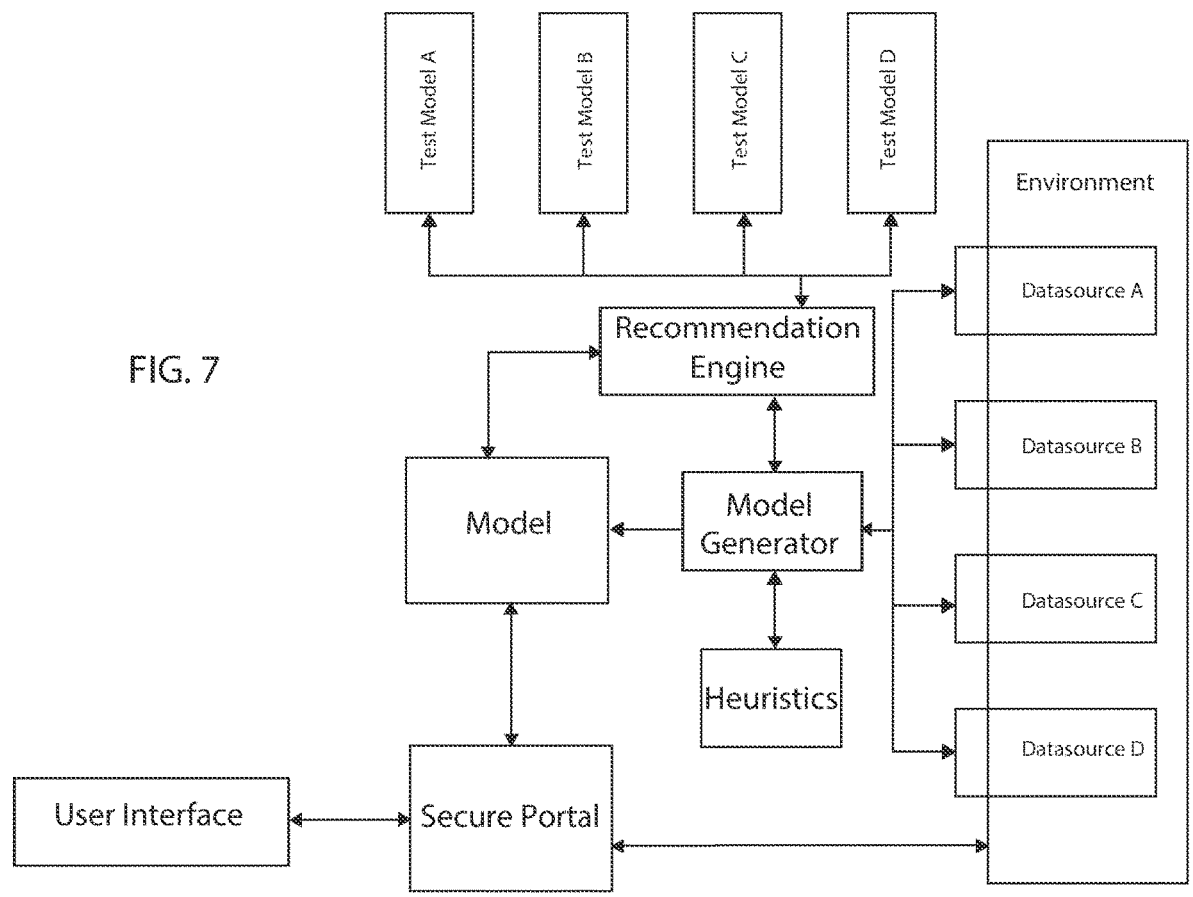
Figure 8:
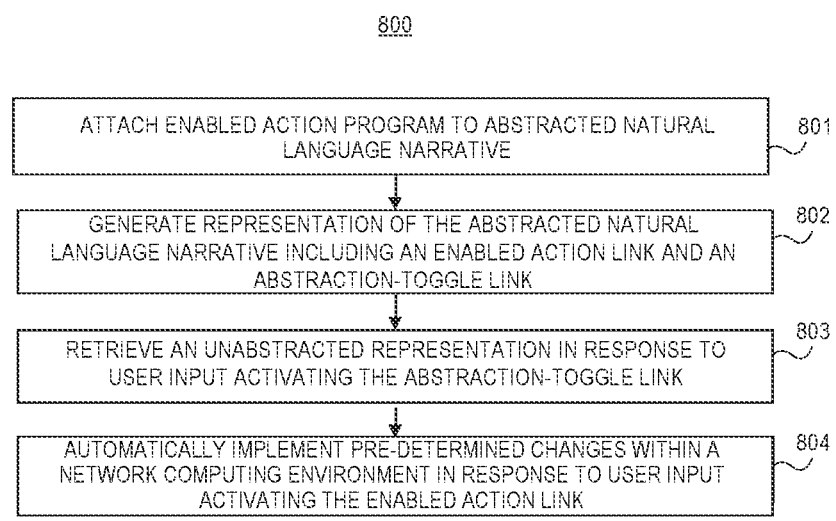
Figure 9A:
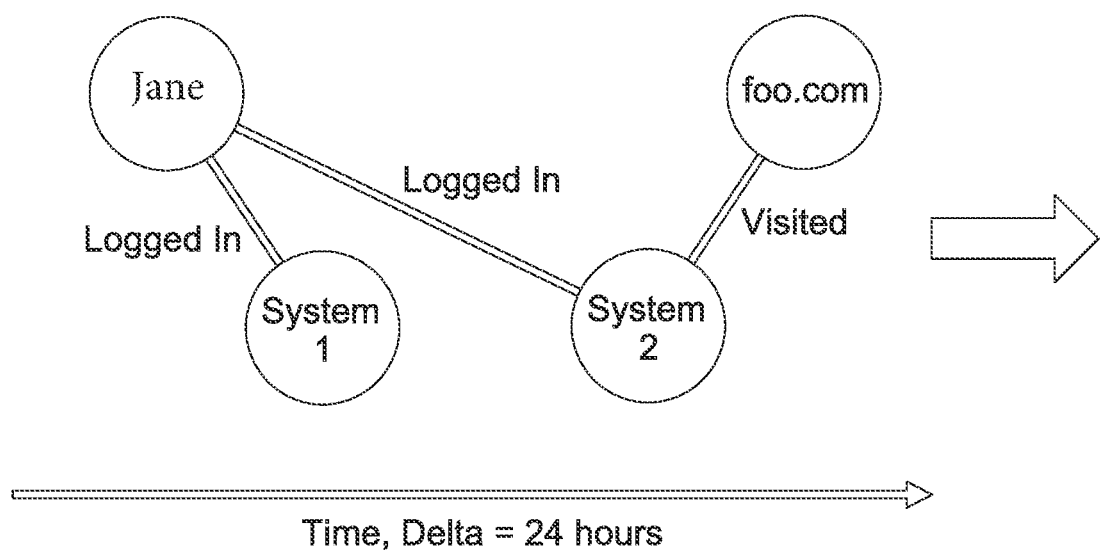
Figure 9B:
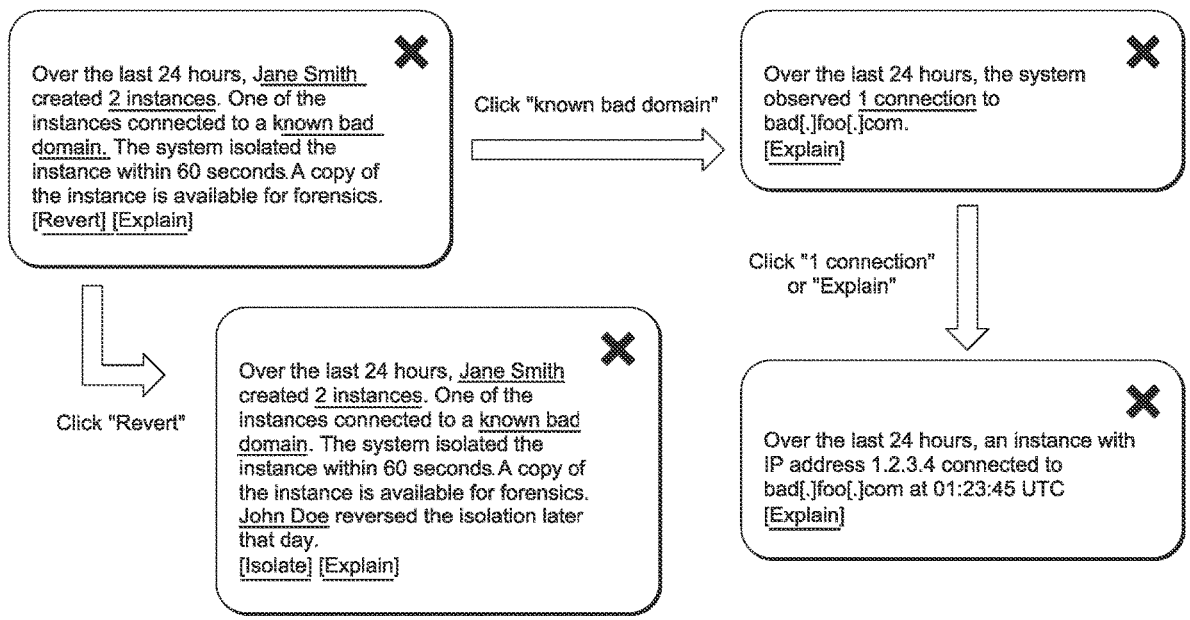
Figure 10:
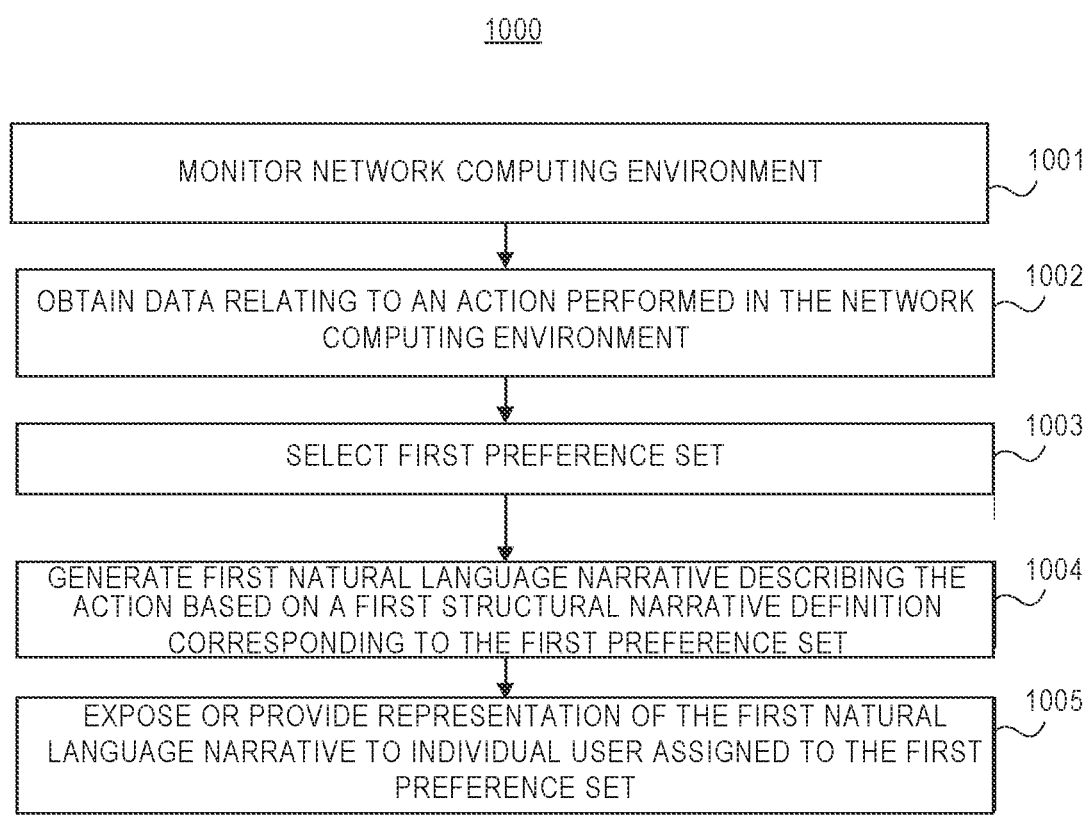
Figure 11:
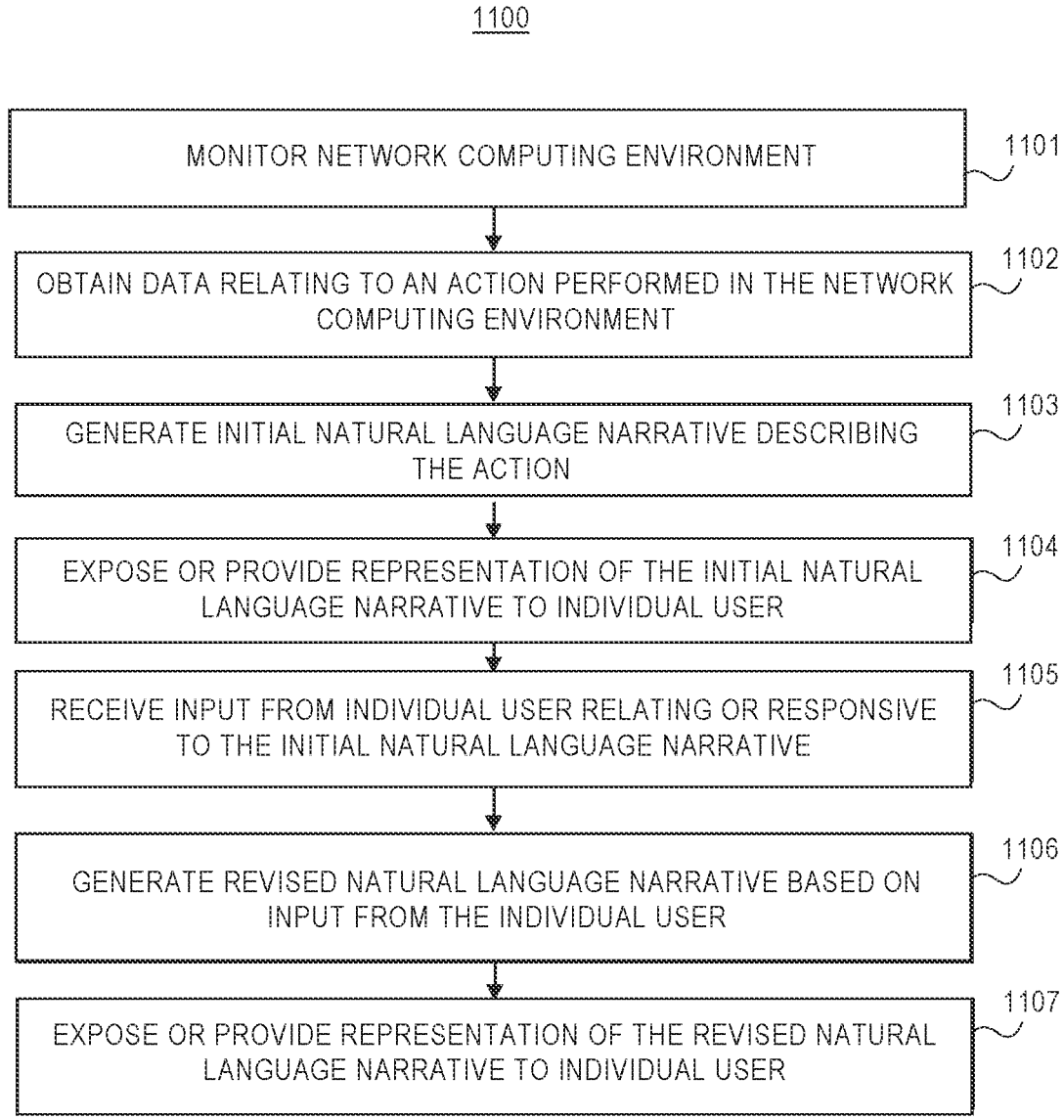

FIG. 7 is a flowchart of exemplary systems and components thereof for resolved and/or expanded entity and activity mapping, and of relationships and communication channels between the components, in accordance with embodiments of the present invention;

FIG. 8 illustrates at least a portion of the steps of an exemplary computer-implemented method for narrative-structured representation of and intervention into a network computing environment in accordance with embodiments of the present invention;

FIG. 9A illustrates a graphical representation of nodes and edges of a graph database model in accordance with embodiments of the present invention;

FIG. 9B is a flowchart illustrating navigation and/or toggling on a screen display between multiple natural language narratives, in accordance with embodiments of the present invention;

FIG. 10 illustrates at least a portion of the steps of an exemplary computer-implemented method for targeted narrative-structured representation of a network computing environment in accordance with embodiments of the present invention; and FIG. 11 illustrates at least a portion of the steps of an exemplary computer-implemented method for feedback-driven narrative-structured representation of a network computing environment in accordance with embodiments of the present invention.

The Figures depict exemplary embodiments for purposes of illustration only. One skilled in the art will readily recognize from the following discussion that alternative embodiments of the systems and methods illustrated herein may be employed without departing from the principles of the invention described herein.

DETAILED DESCRIPTION

Existing methods for representing new environments to users are primitive and fail to provide context useful for network monitoring and security efforts. Further, adjusting such methods to accommodate new data encountered in a new network computing environment and/or managing intervention(s) into such environments requires extensive and time-consuming manual efforts.

A more efficient and enriched method for monitoring and/or representation of and/or intervention into a network computing environment is needed.

According to embodiments of the present invention, a technological mechanism is provided for narrative-structured representation of a network computing environment. These technological mechanisms provide smooth, understandable viewing of portions and slivers of a production graph database model, and navigation between independent, manipulable natural language representations of those portions commensurate with varying levels of abstraction and detail relating to involved entities and activities. Embodiments also provide for improved control of system integrity and security, at least in part through provision of contextualized and actualized intervention means.

Exemplary System

Figure 1:
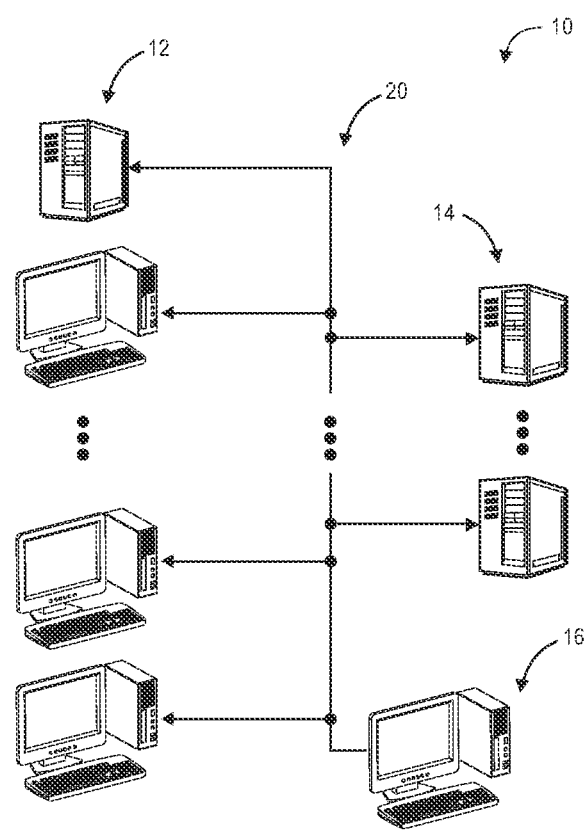
FIG. 1 illustrates various components, in block schematic form, of an exemplary system for monitoring and representation of, and intervention into, a network computing environment in accordance with embodiments of the present invention.

FIG. 1 depicts an exemplary environment 10 for resolved entity and resource description, activity tracking and intervention according to embodiments of the present invention. The environment may include a plurality of client devices 12, a plurality of servers 14, a service device 16, and a communication network 20. The client devices 12 and the servers 14 may be located within network boundaries of a large organization, such as a corporation, a government office, a university, a college, or the like. The communication network 20 may be partly or entirely internal to the organization, for example where the servers 14 manage databases of and/or provide cloud-based services to and under the management of the organization. Also or alternatively, the client devices 12 may access the servers 14 via transmissions, at least in part, across public/semi-public telecommunication network infrastructure, with the communication network 20 being at least in part comprised of such public/semi-public telecommunication network infrastructure.

All or some of the client devices 12 and servers 14, and/or all or some of the virtual resources managed thereby, may at least partly comprise a secure network computing environment. Alternatively or in addition, the client devices 12 and servers 14 may manage access to the client devices 12 and servers 14 under an authentication management framework. For example, each user of a device 12 may be required to complete an authentication process to access secure data sources of and/or services provided via the servers 14 and/or of the devices 12. In one or more embodiments, any authentication management framework may be utilized including, without limitation, custom frameworks and/or frameworks offered under any of the following trademarks and/or service marks as of the date of the initial filing of this disclosure: AWS® SSO and/or COGNITO (trademarks of Amazon Technologies, Inc.), OpenID® Connect (a service mark of the OpenID Foundation), and/or SAML 2.0™ (a service mark of Signet, Inc.).

In one or more embodiments, the client devices 12 may comprise desktops, laptops, tablets or other computing devices belonging to or used by employees of a business organization, with servers 14 being cloud infrastructure of a third-party providing cloud-based storage and/or services (e.g., the use of applications) to the business organization. Also or alternatively, the servers 14 may be the property of the organization. One of ordinary skill will appreciate that embodiments may serve a wide variety of organizations and/or rely on a wide variety of data sources and/or service providers within the scope of the present invention. It should also be noted that reference herein to a "business organization" are made for ease of reference, and that embodiments of the present invention are equally applicable to individual users subscribing to a monitoring service and/or executing the monitoring service internally.

Figure 2:
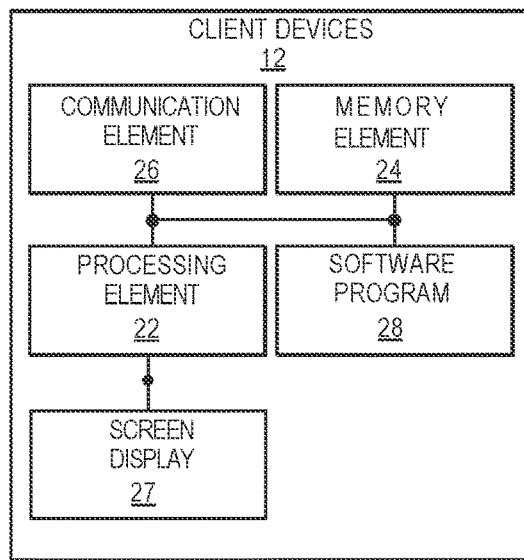
FIGS. 2, 3 and 4 illustrate various components of exemplary computing devices shown in block schematic form that may be used with the system of FIG. 1.
Figure 3:
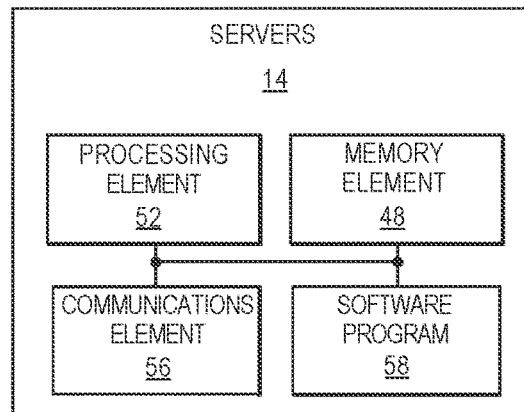
Figure 4:
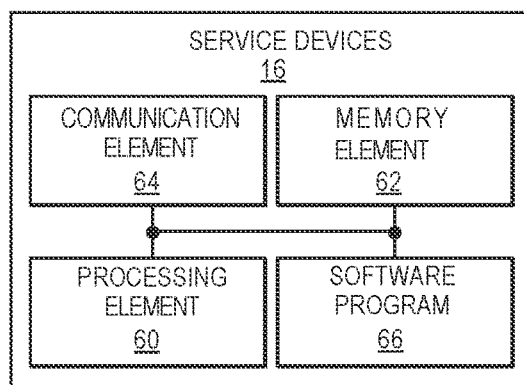

Turning to FIGS. 2 and 4, generally the client devices 12 and the service devices 16 may include tablet computers, laptop computers, desktop computers, workstation computers, smart phones, smart watches, and the like. In addition, the client devices 12 may include copiers, printers, routers and any other device that can connect to the communication network 20. In one or more devices, the client devices 12 and/or the service devices 16 may comprise servers, examples of which are discussed in more detail below.

Client devices 12 and service device 16 may each respectively include a processing element 22, 60, a memory element 24, 62, and circuitry capable of wired and/or wireless communication with the communication network 20, including, for example, a transceiver or communication element 26, 64. Each of the client devices 12 may additionally include a screen display 27, which may comprise a user interface of the client device 12. The display 27 may include video devices of any of the following types: plasma, standard or ultra-high-definition light-emitting diode (LED), organic LED (OLED), quantum dot LED (QLED), Light Emitting Polymer (LEP) or Polymer LED (PLED), liquid crystal display (LCD), thin film transistor (TFT) LCD, LED side-lit or back-lit LCD, or the like, or combinations thereof. The display 27 may possess a square or a rectangular aspect ratio and may be viewed in either a landscape or a portrait mode. In various embodiments, the display 27 may also include a touch screen occupying all or part of the screen.

Further, each of the client devices 12 and the service device 16 may include a software application or program 28, 66 configured with instructions for performing and/or enabling performance of at least some of the steps set forth herein. In an embodiment, the software programs 28, 66 each comprises instructions stored on computer-readable media of memory element 24.

The servers 14 generally receive requests and queries for data and provision of services and resources from the client devices 12 (e.g., in connection with normal operations of a business organization), and expose or otherwise provide such data, services and resources for monitoring, inspection, instrumentation and intervention by the service device 16. In one or more embodiments, the service device 16 enrolls all or some of the client devices 12 and servers 14 and/or the resources embodied thereby collectively as a network computing environment to be monitored by a security service managed and/or hosted by the service device 16.

The servers 14 may comprise cloud servers, domain controllers, application servers, database servers, database web servers, file servers, mail servers, catalog servers or the like, or combinations thereof. In an embodiment, one or more data sources (see FIG. 7) may be maintained by one or more of the servers 14. Generally, each server 14 may include a memory element 48, a processing element 52, a communication element 56, and a software program 58.

The communication network 20 generally allows communication between the client devices 12, the servers 14, and the service device 16, for example in conjunction with authentication framework and/or secure transmission protocol(s) discussed above, as well as in connection with data queries and service requests from the client devices 12 and/or data queries, instrumentation instructions and/or interventions from the service device 16.

The communication network 20 may include the Internet, cellular communication networks, local area networks, metro area networks, wide area networks, cloud networks, plain old telephone service (POTS) networks, and the like, or combinations thereof. The communication network 20 may be wired, wireless, or combinations thereof and may include components such as modems, gateways, switches, routers, hubs, access points, repeaters, towers, and the like. The client devices 12 and/or servers 14 may, for example, connect to the communication network 20 either through wires, such as electrical cables or fiber optic cables, or wirelessly, such as RF communication using wireless standards such as cellular 2G, 3G, 4G or 5G, Institute of Electrical and Electronics Engineers (IEEE) 802.11 standards such as WiFi, IEEE 802.16 standards such as WiMAX, Bluetooth™, or combinations thereof.

The communication elements 26, 56, 64 generally allow communication between the client devices 12, the servers 14, the service device 16 and/or the communication network 20. The communication elements 26, 56, 64 may include signal or data transmitting and receiving circuits, such as antennas, amplifiers, filters, mixers, oscillators, digital signal processors (DSPs), and the like. The communication elements 26, 56, 64 may establish communication wirelessly by utilizing radio frequency (RF) signals and/or data that comply with communication standards such as cellular 2G, 3G, 4G or 5G, Institute of Electrical and Electronics Engineers (IEEE) 802.11 standard such as WiFi, IEEE 802.16 standard such as WiMAX, Bluetooth™, or combinations thereof. In addition, the communication elements 26, 56, 64 may utilize communication standards such as ANT, ANT+, Bluetooth™ low energy (BLE), the industrial, scientific, and medical (ISM) band at 2.4 gigahertz (GHz), or the like. Alternatively, or in addition, the communication elements 26, 56, 64 may establish communication through connectors or couplers that receive metal conductor wires or cables, like Cat 6 or coax cable, which are compatible with networking technologies such as ethernet. In certain embodiments, the communication elements 26, 56, 64 may also couple with optical fiber cables. The communication elements 26, 56, 64 may respectively be in communication with the processing elements 22, 52, 60 and/or the memory elements 24, 48, 62.

The memory elements 24, 48, 62 may include electronic hardware data storage components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof. In some embodiments, the memory elements 24, 48, 62 may be embedded in, or packaged in the same package as, the processing elements 22, 52, 60. The memory elements 24, 48, 62 may include, or may constitute, a "computer-readable medium." The memory elements 24, 48, 62 may store the instructions, code, code segments, software, firmware, programs, applications, apps, services, daemons, or the like that are executed by the processing elements 22, 52, 60. In an embodiment, the memory elements 24, 48, 62 respectively store the software applications/program 28, 58, 66. The memory elements 24, 48, 62 may also store settings, data, documents, sound files, photographs, movies, images, databases, and the like.

The processing elements 22, 52, 60 may include electronic hardware components such as processors. The processing elements 22, 52, 60 may include digital processing unit(s). The processing elements 22, 52, 60 may include microprocessors (single-core and multi-core), microcontrollers, digital signal processors (DSPs), field-programmable gate arrays (FPGAs), analog and/or digital application-specific integrated circuits (ASICs), or the like, or combinations thereof. The processing elements 22, 52, 60 may generally execute, process, or run instructions, code, code segments, software, firmware, programs, applications, apps, processes, services, daemons, or the like. For instance, the processing elements 22, 52, 60 may respectively execute the software applications/programs 28, 58, 66. The processing elements 22, 52, 60 may also include hardware components such as finite-state machines, sequential and combinational logic, and other electronic circuits that can perform the functions necessary for the operation of the current invention. The processing elements 22, 52, 60 may be in communication with the other electronic components through serial or parallel links that include universal busses, address busses, data busses, control lines, and the like.

Data queries or requests for services may be initiated via user applications embodied, controlled and/or executed by client devices 12 and/or the service device 16. In an embodiment, access to user applications, the client devices 12 and/or the service device 16 is granted via the authentication framework outlined above, such as through known single sign-on (SSO) processes.

Data sources hosted by the servers 14 may utilize a variety of formats and structures within the scope of the invention.

For instance, relational databases and/or object-oriented databases may embody the data sources, and may be exposed for queries by one or more corresponding application programming interfaces (APIs). One of ordinary skill will appreciate that—while examples presented herein may discuss specific types of operating systems and/or databases—a wide variety may be used alone or in combination within the scope of the present invention.

In a preferred embodiment, the software program 58 of one or more of the servers 14 may translate data from the authentication management framework into identity information for use in connection with authenticating individuals or end users for access to data and services. The identity information may be used, for example, to determine the access rights enjoyed by the end user through reference to a permission store such as an access database and/or one or more authentication/authorization databases maintained by servers 14. One of ordinary skill will appreciate that a variety of user information—including, without limitation, credentials—may comprise and/or be used to generate the identity information within the scope of the present invention. It is foreseen that the program 58 may function in connection with a variety of authentication frameworks without departing from the spirit of the present invention.

The permission store may comport with role-based access control, discretionary access control, mandatory access control, other access control strategies and/or combinations thereof without departing from the spirit of the present invention. One of ordinary skill will appreciate that various structures for maintaining access control lists, groupings and/or permissions carry unique advantages and disadvantages. Moreover, the maintenance and storage of such access management frameworks may be dispersed across various components of the platform of embodiments of the present invention and/or the servers 14 without departing from the spirit of the present invention. One of ordinary skill will appreciate that embodiments of the present invention may vary in the structure and disposition of access control mechanisms utilized for querying databases.

The program 58 may permit an administrator to grant user access to particular users, devices, user applications and/or groups of user applications. For example, the program 58 may permit an administrator of the exemplary business organization to grant the service device 16 and/or a service provider employee of the corresponding security service access to those aspects of the client devices 12 and servers 14 which comprise the network computing environment to be monitored under the access management framework. One of ordinary skill will appreciate that the software program 28 of one or more of the client devices 12 may similarly manage access by the service device 16 to aspects of the client devices 12 and/or data stored thereby, particularly where such aspects form a part of or relate to the monitored network computing environment.

In one or more embodiments the service device 16 implements a security service that includes monitoring of and/or intervention into a network computing environment embodied by aspects of the client devices 12 and/or servers 14. Activity occurring in the network computing environment may include any change or group of state changes in that network such as, for example, movement of data, issuance or receipt of a request or command, inclusion or exclusion of a physical device, granting of permission or access rights, creation or deletion of a logical or virtual partition or entity, establishment or deletion of a communication channel, and any other state change(s) within the network computing environment. Entities in the environment include actors that may act or be acted upon within the network computing environment, and/or that are impacted by state change(s), and/or that may trigger or be involved in the performance of an activity, such as, for example, resources (including assets, physical devices, databases, virtual devices, communication channels, API gateways, etc.), user(s) or other person(s), buckets, access keys, user account(s), roles, regions, functions, IP addresses, and other actors that may be involved in an activity.

In a preferred embodiment, the program 66 is configured to automatically discover, enumerate, classify and expose resources, entities and relationships within the network computing environment, including by making primarily automatic adjustments for newly-discovered entities and relationships. The program 66 is further configured to increase entity resolution and enable improved identity tracing through dynamic graph database modeling and natural language processing.

In a preferred embodiment, the security service and/or service device 16 may construct statements or commands that automatically place blocks or restrictions on or otherwise alter activity of entities in the network computing environment, the client devices 12 and/or the servers 14 if one or more criteria are satisfied. For example, periodically or on a continual, rolling basis, the program 66 may evaluate system events, system logs, and/or network traffic for the occurrence of events of interest. An event of interest may trigger the block, restriction or other alteration (e.g., with respect to an associated end user or other entity). Related embodiments are discussed in more detail below. Events of interest may include end user behavior or any other activity—whether considered singly or in combination with other activities and/or over time—on the network that may warrant further observation and/or intervention such as, for example, where it is indicative of inauthentic access, access exceeding normal work needs, abnormal access(es), unauthenticated access(es), or other undesired data access events and/or malware.

A notification to an owner or administrator (e.g., at a screen display of a client device 12) may be automatically composed by the program 66 in relation to an event of interest or activity of concern, and may include: information regarding the triggering activity of concern within the network computing environment; information regarding why the activity is of concern; one or more proposed enabled action programs and links for executing same; and other useful information or functions. One of ordinary skill will appreciate that the automatically-generated contents of the notification may vary within the scope of the present invention.

In a preferred embodiment, the program 66 is also configured to automatically (i.e., without human intervention) construct an enabled action program to apply an intervention prescribed for an event of interest. An administrator using a client device 12 (e.g., an administrator of the exemplary business organization) may then be presented with the option of activating the enabled action program, as discussed in more detail below.

One of ordinary skill will appreciate that the specific mechanism for applying an intervention to an entity within a network computing environment in connection with an anomalous or threatening activity or event, or with any other activity in the environment, may vary within the scope of the present invention.

Through hardware, software, firmware, or various combinations thereof, the processing elements 22, 52, 60 may—alone or in combination with other processing elements—be configured to perform the operations of embodiments of the present invention. Specific embodiments of the technology will now be described in connection with the attached drawing figures. The embodiments are intended to describe aspects of the invention in sufficient detail to enable those skilled in the art to practice the invention. Other embodiments can be utilized and changes can be made without departing from the scope of the present invention. The system may include additional, less, or alternate functionality and/or device(s), including those discussed elsewhere herein. The following detailed description is, therefore, not to be taken in a limiting sense. The scope of the present invention is defined only by the appended claims, along with the full scope of equivalents to which such claims are entitled, unless otherwise expressly stated and/or readily apparent to those skilled in the art from the description.

Figure 5:
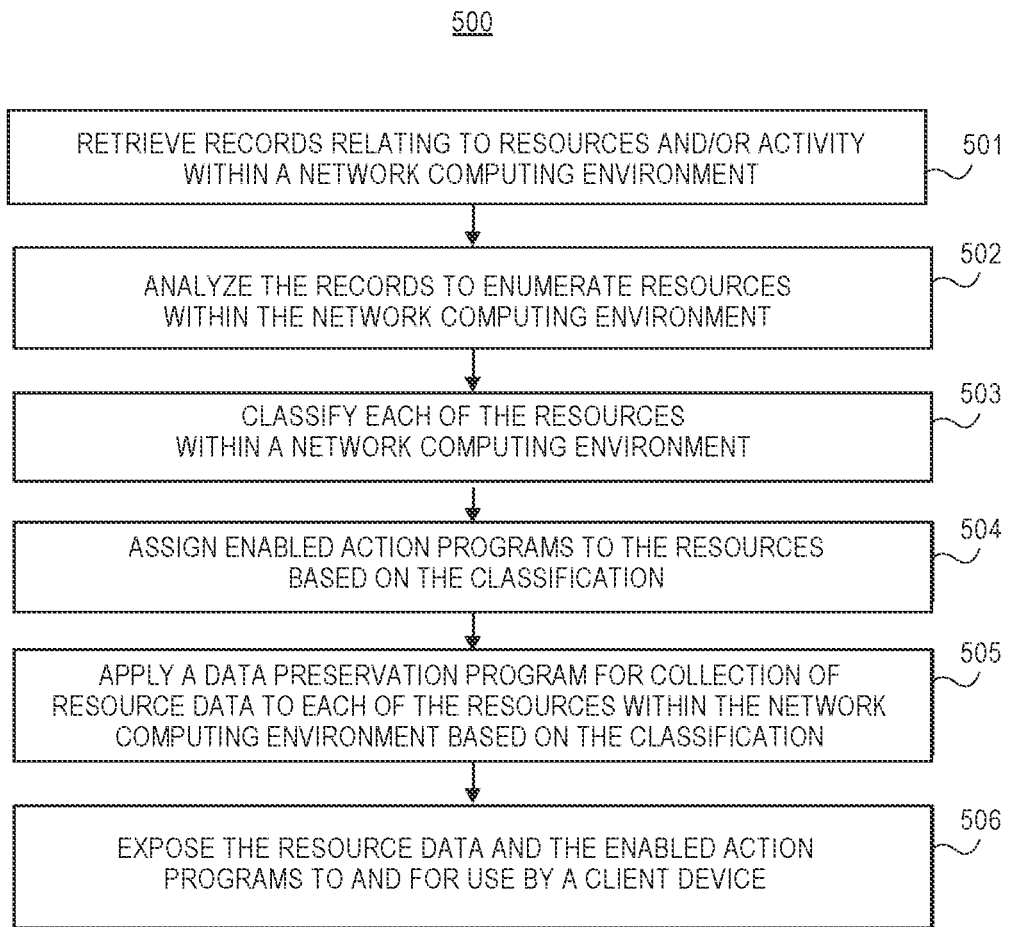
FIG. 5 illustrates at least a portion of the steps of an exemplary computer-implemented method for resource preservation and intervention in accordance with embodiments of the present invention.

Exemplary Computer-Implemented Method for Resource Preservation and Intervention FIG. 5 depicts a flowchart including a listing of steps of an exemplary computer-implemented method 500 for resource preservation and intervention. The steps may be performed in the order shown in FIG. 5, or they may be performed in a different order. Furthermore, some steps may be performed concurrently as opposed to sequentially. In addition, some steps may be optional.

The computer-implemented method 500 is described below, for ease of reference, as being executed by exemplary devices and components introduced with the embodiments illustrated in FIGS. 1-4, 7 and 9. For example, the steps of the computer-implemented method 500 may be performed by the client devices 12, the servers 14, the service device 16 and the network 20 through the utilization of processors, transceivers, hardware, software, firmware, or combinations thereof. However, a person having ordinary skill will appreciate that responsibility for all or some of such actions may be distributed differently among such devices or other computing devices without departing from the spirit of the present invention. One or more computer-readable medium(s) may also be provided. The computer-readable medium(s) may include one or more executable programs stored thereon, wherein the program(s) instruct one or more processing elements to perform all or certain of the steps outlined herein. The program(s) stored on the computer-readable medium(s) may instruct the processing element(s) to perform additional, fewer, or alternative actions, including those discussed elsewhere herein.

Referring to step 501, records relating to entities, resources and/or activity within a network computing environment may be retrieved. In one or more embodiments, the records are data records containing data elements relating to the entities, resources and/or activity. The data records may also comprise structured and labeled data. The records may relate to entities, resources and/or activity in an exemplary network computing environment comprising one or more cloud computing accounts and/or cloud services hosted by a cloud service provider on behalf of a business organization. Exemplary cloud services may include one or more of Infrastructure-as-a-Service (IaaS), Platforms-as-a-Service (PaaS), and Software-as-a-Service (SaaS). The exemplary computing environment may also or alternatively encompass all or part of an internal network of the business organization comprising one or more client devices and resources.

The records may be obtained by a service device or client device implementing a security monitoring service for the business organization (in either case, the "monitoring device"). The monitoring device may retrieve the records from one or more data sources including, for example, database(s) managed by the monitoring device and/or by calling an application programming interface (API) with a request for the records. The API may, in one or more embodiments, be managed by a database management system of a client device or server of the business organization and/or of a server of the cloud service provider. The records may be retrieved continuously, intermittently, in response to a trigger and/or the passage of a pre-determined period of time without departing from the spirit of the present invention.

Retrieval of the records may follow and/or be triggered by setup for or enrollment by the business organization or client device in the security monitoring service. For example, in one or more embodiments an administrative employee or "owner" of the service may input instructions into a client device requesting enrollment in the monitoring service. Via user input, the owner may designate or identify, during the service enrollment process, the one or more physical and/or virtual/logical and computing components of the client devices and/or cloud service provider devices and/or the accounts, services and other environmental aspects that together comprise the "network computing environment" to be monitored. The owner may also provide access credentials or instruct or reconfigure corresponding access management framework(s) to permit the monitoring device(s) the requisite access to perform the monitoring service. The owner may further select one or more monitoring services and/or tier(s) of service for application to the network computing environment.

Other aspects of the owner setup process may be conducted in a manner known in the art. The owner setup process may, for example, be conducted via a web interface or the like managed by or otherwise in communication with the monitoring device. The program of the monitoring device may prompt the owner to create an account and login credentials, select a service type, enter payment information, and otherwise provide information and input required to set up enrollment and monitoring services of the type(s) discussed herein.

Referring to step 502, the records may be analyzed to enumerate entities and resources within the network computing environment. In one or more embodiments, the resources may comprise assets, physical devices, databases, virtual devices, communication channels, API gateways, or the like. Any element of the network computing environment to which an action or activity may be attributed, on which an action or activity may be performed, or that is otherwise logically partitioned within the network computing environment may be enumerated within the scope of the present invention.

In one or more embodiments, the monitoring device may enumerate the entities and resources by parsing the records for classification. For example, where system logs, security information and event management (SIEM) logs, threat intelligence or other records retrieved from the data source(s) comprise structured data, the monitoring device may pre-process the records by parsing them into groups and/or culling the records for relevant data elements supporting classification operations. One of ordinary skill will appreciate, however, that parsing may be unnecessary in embodiments of the present invention, such as to the extent an API call by the monitoring device to one or more resources in the network computing environment yields labeled listing(s) ready for registration. The monitoring device may also configure the network computing environment (e.g., the API) to periodically or continuously report updates or changes to listing(s) of resource(s).

Referring to step 503, the entities and resources may be classified based on all or some of the data elements of the records. In one or more embodiments, the monitoring device may apply a set of criteria associated with each of a plurality of pre-defined categories of resources to the analyzed records. Application of the criteria may lead to classifying each resource within one of the pre-defined categories. For example, data elements of the records may fit criteria associated with APIs, databases, virtual machines, computing devices, communication channels, or other resource categories that may be found within the network computing environment. Wherever a sufficient match to the criteria is found, the corresponding resource may be classified in the corresponding pre-defined category or class.

Referring to step 504, enabled action programs may be assigned to the entities and resources based on the classification. An enabled action program comprises computer-executable instructions for making a pre-determined change in the network computing environment—for example, to the behavior and/or capabilities of one or more resource(s) therein—automatically based on receipt of a corresponding user input activating the enabled action program. Examples of known commands and changes that may be included in or executed pursuant to an enabled action program include, without limitation: Stop, Start, Suspend, Shutdown, Remove, Delete, Move, Prevent, Copy, Backup, Restore, Install, Uninstall, Run, Collect, Acquire, Add/Remove/Change Policy, Isolate, and Quarantine.

In one or more embodiments, the monitoring device may be configured to retrieve, manage and/or update a list of possible enabled action programs corresponding to the class or category of each classified entity and resource. For example, database resources may be associated with read/write permissions and an enabled action program may be configured to make modifications thereto (e.g., by limiting location of internet protocol (IP) addresses permitted to read and/or write, amount or types of data that may be accessed, timeframes of permitted access, or the like). For another example, a computing device resource may be associated with a shutdown enabled action program configured to initiate a shutdown procedure for the machine. In each case, the monitoring device may maintain and/or access a list of possible actions that may be performed on or changes that may be made to a resource according to its class.

One of ordinary skill will appreciate that the monitoring device implementing the security service may assign a subset of all possible actions within the corresponding class to an entity or resource. The monitoring device may be configured to select only those actions that may conceivably impact system integrity or security goals from among all possible actions for inclusion in corresponding enabled action programs. For example, where a possible action on a resource is typically only effective where a corresponding resource (e.g., of a given configuration or operational aspect) is also found in the network computing environment, or conversely where the corresponding resource is absent, the monitoring device may apply a filter or rule configured to check for the presence or absence of the corresponding resource and accordingly exclude a corresponding enabled action program from generation and/or exposure to the owner or business organization (discussed in more detail below).

The monitoring device implementing the security service may also be configured to automatically or upon request generate the enabled action programs based on the possible (or selected) actions available for use on a given resource type or class. The enabled action program(s) may be automatically generated based on, for example, unique details of the network computing environment and/or of the resources populating the environment, using one or more templates for the enabled action programs as a guide. In one or more embodiments, the templates will set forth generally applicable commands, instructions, routines, scripts or the like, pre-configured for completing the action in question across a variety of environments, but will include markers or other signal elements indicating segments where customization for the environment is needed and/or data or computer-executable instructions are missing. The monitoring device may be configured to recognize the markers or signal elements, and to retrieve and insert or link the missing instructions or data to complete the program. Examples of missing code and/or data may include any of the following where required or recommended for successful execution of an enabled action program: definition of a syntax utilized by an API; access credentials; device name or unique identifier; IP address(es); metadata regarding stored data; network address(es); and/or other information unique to the environment or otherwise required for filling out a template to form an executable enabled action program.

The monitoring device may more generally be configured to retrieve additional data wherever required to support classification operations and/or generation or assignment of the enabled action program(s) corresponding to each resource. The monitoring device may also or alternatively be configured to retrieve additional data in response to observation of one or more activities in another network computing environment that share a common *nexus* with one or more resources within the network computing environment. Retrieval may be automatically initiated upon a determination that a classification and/or enabled action program generation or assignment operation cannot be completed without missing data, and/or that a common *nexus* is of a type and import justifying added data collection.

The monitoring device may rely on access credentials provided by the owner wherever necessary to retrieve additional data. For example, wherever a resource does not meet the criteria of any pre-defined category and/or cannot be initially classified because it meets the criteria of multiple such categories, and/or where additional data required to complete or assign an enabled action program is missing, the monitoring device may be configured to acquire the additional data.

In one or more embodiments, the monitoring device may activate or reconfigure an existing data collection function within the network computing environment and/or install a supplemental monitoring program for execution within or in communication with the network computing environment to report out and/or expose the missing or additional data. Also or alternatively, the monitoring device may call or set up a recurring call to an API of the network computing environment to obtain or retrieve the missing data.

Referring to step 505, a data preservation program may be applied, based on the classification, to each of the entities and/or resources for collection of resource data within the network computing environment. A data preservation program comprises instructions for and/or specification of the collection of certain pre-determined types of data in the network computing environment.

In one or more embodiments, the monitoring device implementing the security service may be configured to retrieve the preconfigured data preservation program associated with the class of each classified one of the resources.

For example, database resources may be associated with a data preservation policy requiring the corresponding management system to retain metrics such as average data read requests from external systems or user identification information. For another example, a computing device resource may be associated with a data preservation policy requiring retention of data regarding any reboot event or sequence. In each case, the monitoring device may maintain and/or access the preconfigured data preservation programs or policies for application against each of the classified resources.

Execution of a data preservation program against a corresponding one of the classified resources may comprise any or all of: adjusting data retention and/or computation policies at the service or client devices and/or at the servers of the cloud service provider; setting up and implementing additional API calls to the cloud service provider; activating or reconfiguring existing data collection function(s) within the network computing environment; and/or installing a supplemental monitoring program for execution within or in communication with the network computing environment to report out and/or expose data required by the data preservation policy. The data preservation program may include time limits for one or more aspects of corresponding data collection or exposure or be implemented indefinitely within the scope of the present invention.

Referring to step 506, the resource data and the assigned enabled action programs may be exposed to and for use by a client device. In one or more embodiments, the monitoring device will configure an API of the security service and/or the cloud service provider to provide representations of the pre-defined resource data and of the enabled action programs for each of the entities and resources to the client device, and to receive and convey user input from the client device comprising selection of one of the enabled action programs. In this manner, the client device may enable, for example, the owner and/or other employees of the business organization to activate or execute one or more of the enabled action programs and to view and retrieve the resource data. In one or more embodiments, aspects of the data preservation program may also be subject to activation by such user(s) prior to collection of the corresponding resource data.

It should be noted that, in one or more embodiments, the owner will be permitted—e.g., via the web interface portal through which setup for the monitoring service was initially completed—to select one or more enabled action programs and/or data preservation programs suggested and/or configured by the monitoring device for implementation. For example, where data security concerns are too great to implement all aspects of a data preservation program recommended by the monitoring device, the owner may reduce exposure of corresponding data and thereby customize the data preservation program from the originally-recommended form. For another example, the owner may decline to put one or more enabled action program(s) into production in the monitoring service based on, for example, a subjective determination of the likelihood such program(s) will positively impact the goals of the monitoring service.

Moreover, once exposure has been achieved, the owner and/or other user(s) of the business organization may provide user input at one or more of the client devices instructing execution of the enabled action program(s) assigned to one or more of the resources in the network computing environment. In response to the user input, the monitoring device may execute the selected enabled action program to implement the pre-determined changes to the corresponding resource(s) within the network computing environment.

Further, in one or more embodiments, the monitoring device may be configured to automatically perform the steps of the computer-implemented method each time a record reflecting an unregistered or unclassified resource is received, thereby dynamically updating a register of classified resources.

It should be reiterated that a central goal of embodiments of the present invention is to provide a technological mechanism for resource preservation and intervention. Namely, embodiments of the present invention automatically classify resources within a network computing environment and select data preservation and enabled action programs that are customized for the network computing environment. This presents an improved method for providing visibility into operation of resources within the network computing environment and the ability for owner(s) or others administrating or participating in utilization of monitoring service(s) to intervene in pre-determined and system-specific ways to preserve, for example, system integrity and security.

The method may include additional, less, or alternate steps and/or device(s), including those discussed elsewhere herein, unless otherwise expressly stated and/or readily apparent to those skilled in the art from the description.

Exemplary Computer-Implemented Method for Expanded Entity and Activity Mapping

Figure 6:
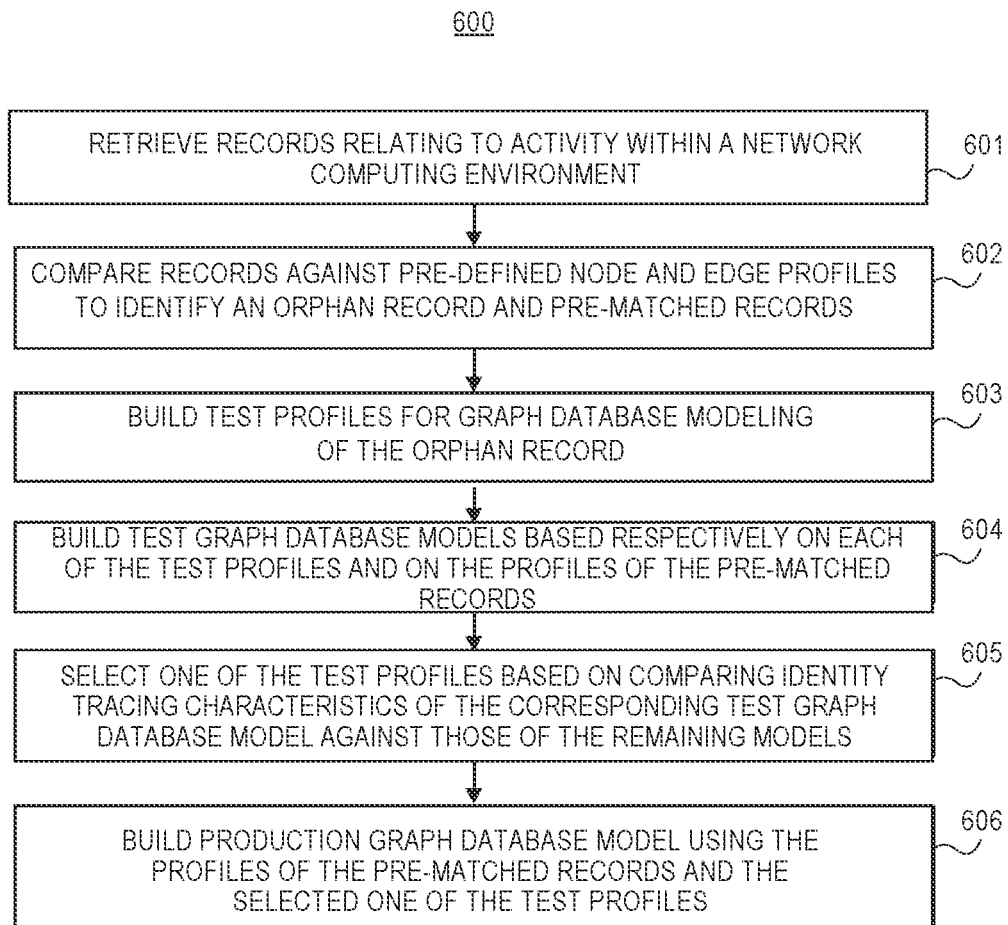
FIG. 6 illustrates at least a portion of the steps of an exemplary computer-implemented method for resolved and/ or expanded entity and activity mapping in accordance with embodiments of the present invention.

FIG. 6 depicts a flowchart including a listing of steps of an exemplary computer-implemented method 600 for expanded entity and activity mapping. The steps may be performed in the order shown in FIG. 6, or they may be performed in a different order. Furthermore, some steps may be performed concurrently as opposed to sequentially. In addition, some steps may be optional.

The computer-implemented method 600 is described below, for ease of reference, as being executed by exemplary devices and components introduced with the embodiments illustrated in FIGS. 1-4, 7 and 9. For example, the steps of the computer-implemented method 600 may be performed by the client devices 12, the servers 14, the service device 16 and the network 20 through the utilization of processors, transceivers, hardware, software, firmware, or combinations thereof. However, a person having ordinary skill will appreciate that responsibility for all or some of such actions may be distributed differently among such devices or other computing devices without departing from the spirit of the present invention. One or more computer-readable medium(s) may also be provided. The computer-readable medium(s) may include one or more executable programs stored thereon, wherein the program(s) instruct one or more processing elements to perform all or certain of the steps outlined herein. The program(s) stored on the computer-readable medium(s) may instruct the processing element(s) to perform additional, fewer, or alternative actions, including those discussed elsewhere herein.

In one or more embodiments, the computer-implemented method 600 may be performed at least in part by a monitoring device implementing a security monitoring service (discussed above). The monitoring device may implement the system illustrated in FIG. 7 in connection with performing steps of the computer-implemented method 600, as discussed in more detail below.

Referring to step 601, records relating to activity within the network computing environment may be retrieved. In one or more embodiments, the records may include records retrieved in connection with resource preservation and intervention according to computer-implemented method 500 discussed above. Further, the records may be retrieved from resources and/or data sources within the network computing environment such as those discussed in more detail above in connection with the computer-implemented method 500. Turning briefly to FIG. 7, the records may be retrieved from one or more of Data Sources A-D of the depicted environment. In one or more embodiments of FIG. 7, the secure portal, model, model generator, heuristics, recommendation engine and test models are managed by and/or hosted on the monitoring device and are discussed in more detail below.

Still further, the records may be retrieved through instrumenting the network computing environment to generate/expose previously-uncollected or previously-unexposed data, as discussed in more detail above. Yet still further, the records may be retrieved continuously, intermittently, and/or in response to a trigger and/or the passage of a pre-determined period of time, and may be preceded by owner enrollment processes, as discussed in more detail above. One of ordinary skill will appreciate, however, that record retrieval according to step 601 may occur independently of and/or may not be preceded by one or more of the steps outlined in connection with the computer-implemented method 500 without departing from the spirit of the present invention.

The records may comprise data elements, and may be structured. In one or more embodiments, the monitoring device may alternatively be configured to parse and label unstructured data for use in the computer-implemented method 600.

The monitoring device may be configured to recognize within the records data types (e.g., labels) fitting within any of "actor," "action" and "acted upon" categories. For example, a record may include multiple labeled data elements correlating to a subject (actor), verb (action) and target (acted upon). Exemplary verbs or actions corresponding to activities within the network computing environment include, without limitation: read/write operations, backup operations, transmissions, login attempts, execution of computer-readable instructions, creation or removal of an entity within the network computing environment, application of a restriction or permission to an entity within the network computing environment, and any other observable changes in state within the network computing environment.

In one or more embodiments, the monitoring device is configured to interpret a first data field of the record as identifying the "actor," a second data field as identifying the "action," and a third data field as identifying the "acted upon." The configuration may be based on known convention—such as where records obtained from a particular data source or class of resource are known to list actors first, and acted upon last, or where the labels themselves indicate the roll of each element—or may be learned by the monitoring device by observing the network computing environment.

The monitoring device may analyze records from each corresponding reporting resource or data source to determine a syntax or format utilized by the resource or data source in generating records (e.g., to discern which element(s) of a record from the resource or data source correlate to the "actor" and which to the "acted upon"). For example, the monitoring device may be configured to automatically compare multiple records relating to the same or similar events or activities within the network computing environment—such as where the records are retrieved from multiple different resource or data sources in the environment—to determine which entity was, in fact, the actor and which the acted upon. The comparison may include an analysis of constituent labeled data elements that, for example: (1) determines that the multiple records are reporting on or relate to the same action or event; (2) determines whether one of the records reports a data element known to relate to only one of an "actor" and an "acted upon" and/or uses an if/then process of elimination to compare the records and determine that one of the elements must correlate to one of the "actor" and the "acted upon"; and (3) upon identification of one or both of the "actor" and the "acted upon" for the event or activity in question, analyzes each corresponding record to discern a reporting format therefore. The monitoring device may store the determined syntax and/or format for use in interpreting future and/or other records received from each of the corresponding resources or data sources.

An entity may be any physical or virtual actor or acted upon element of the network computing environment. An entity may be any element of the network that can be described with identifying characteristics that persist across multiple encounters and/or across time (that is, the entity is recognizable upon a second encounter based on a first encounter). In one or more embodiments, an entity may be any resource (e.g., asset) within the network computing environment, and may be any person, account (e.g., associated with one or more person(s) or user(s)), access key, user, bucket, or other physical or virtual/logical element of the network computing environment meeting one or more of the definition(s) set out above. In one or more embodiments, delineation between entities may be driven by optimization of identity tracing characteristics of a database model discussed in more detail below.

Referring to step 602, the records may be compared against pre-defined node and edge profiles to identify an orphan record and pre-matched records. Returning briefly to FIG. 7, the model generator may store and/or retrieve the pre-defined node and edge profiles from the model.

Data elements of the records may be referred to as "graph elements" when incorporated into a graph database model of embodiments of the present invention. The graph database model may include nodes, edges and properties of the nodes and/or edges, and may be constructed from records of the network computing environment to optimize identity-tracing characteristics discussed in more detail below. The graph database model and/or the graph database from which the model is generated may be distributed across one or more computing devices, such as one or more of the client device(s), service device and/or cloud server(s).

Nodes of the graph database may correspond to entities and edges may correspond to actions, activities or other relationships within the network computing environment. However, it should be noted that entities may be modeled as edges and actions, activities and/or relationships as nodes without departing from the spirit of the present invention. For ease of description, discussion herein will focus on embodiments treating entities as nodes and actions, activities or other relationships as edges.

Each pre-defined node profile essentially comprises a set of instructions for how to represent or model an entity within the graph database model. For example, the node profile may: include a list of entity types covered by the profile; list one or more data elements to be used in the model to represent or differentiate a particular entity from other entities of the network computing environment; list one or more properties (e.g., additional data or metadata relating to the entity or corresponding node) that should be stored and/or retrieved for use in the graph database model; list one or more edge types (e.g., relationship or activity types) that should be connected to the node, including by defining any directionality the edge(s) may possess; and otherwise provide a definition for how the monitoring device should represent the entity and connected interrelationships within the graph database model.

Likewise, each pre-defined edge profile essentially comprises a set of instructions for how to represent or model an action or activity (or other relationship) within the graph database model. For example, the edge profile may: include a list of relationship types covered by the profile; list one or more data elements to be used in the model to represent or differentiate a particular relationship from other relationships within the network computing environment; list one or more properties (e.g., additional data or metadata relating to the edge) that should be stored and/or retrieved in connection with the edge for use in the graph database model; list one or more node types (e.g., entity types) that should be connected to the edge; and otherwise provide a definition for how the monitoring device should represent the edge and connected interrelationships within the graph database model.

Matching the records against the pre-defined node and edge profiles may include extracting data elements from the records that are representative of unique entities or relationships and/or of types of entities or relationships. It should also be noted that, in one or more embodiments, extraction may be unnecessary where rendered duplicative or unnecessary by preceding or simultaneous resource enumeration processes discussed above in connection with the computer-implemented method 500. The matching may further include classifying unique entities or relationships, particularly where the extracted data elements reflect unique identifying information for an entity or relationship but are not easily classified within a type or category covered by a profile.

For example, a record may reflect that a cloud user account AA requested read access to a relational database DB on date DA. Where the monitoring device and pre-defined node profiles are configured to match at a level of abstraction corresponding to "cloud user account" and "relational database," no further classification operation may be necessary for the matching operation to be completed. However, where the monitoring device and pre-defined node profiles are configured to match at a higher level of abstraction—e.g., at "user account" and/or "database" levels—the monitoring device may be configured to analyze and perform further classification operations sufficient to complete matching against the pre-defined node profiles. Analogous principles apply to matching against pre-defined edge profiles.

In one or more embodiments, additional data elements may be extracted for use in the matching operation. For example, wherever an entity does not readily fit into a list of covered entities of a pre-defined node profile—such as where available data does not readily identify it as a "user account," "database" or other covered entity type—the monitoring device may be configured to rely on data elements comprising secondary indicia of entity type. Secondary indicia may relate to, for example, when an entity acts within the network computing environment, which elements the entity acts on or receives actions from, what actions the entity performs, or other such factors. In one or more embodiments, whenever available data regarding an entity satisfies a threshold or pattern of such secondary indicia, the entity may be matched to the pre-defined node profile. Analogous principles apply to matching relationships reflected in records against pre-defined edge profiles.

The pre-matched records are those reflecting entities and relationships that satisfy the matching operations outlined above for one or more of the pre-defined node and edge profiles. That is, the entities and relationships of the pre-matched records sufficiently match the corresponding pre-defined node and edge profiles to be modeled according to those profiles within the graph database model.

An orphan record, on the other hand, reflects or describes an entity or relationship that does not sufficiently match to a pre-defined node or edge profile. That is, the non-matching entity or relationship is of a type that is not covered by any of the pre-defined node and edge profiles, for example because labeled data elements do not sufficiently place it within one of such profiles or because secondary indicia data elements relating to behavior within the network computing environment do not adequately match behavior of a known type of entity or relationship as represented by the profiles.

Moreover, the heuristics component of FIG. 7 may supply the pre-defined rules and heuristics for comparing data records against pre-defined node and edge profiles discussed in more detail above. It should also be noted that an orphan record is one which reflects at least one entity or relationship that does not match to a corresponding one of the pre-defined node and edge profiles. The orphan record may also reflect one or more entities or relationships that do match a corresponding one of the predefined node and edge profiles without departing from the spirit of the present invention (such as where an actor does not match an existing profile, but the corresponding action and target do match corresponding pre-defined edge and node profiles).

Referring to step 603, a plurality of test profiles may be built or generated for graph database modeling of the orphan record. In one or more embodiments, all or some of the test profiles may respectively be automatically built by borrowing parts from pre-defined profiles that were determined to be closely matched during the preceding comparison step 602 or, in other words, were selected from a pool of candidate test profiles based on similarity. For example, the monitoring device may be configured to build a first test profile based partly or completely on a pre-defined profile with a closest comparison score with respect to secondary indicia (i.e., observed behavior within the environment) as determined in connection with step 602. It is foreseen that the first test profile may also be built through fragmented analysis and comparison, such as where a first aspect of the first test profile (e.g., unique identifying data) is derived from a closest match among the candidate profiles along a first dimension, whereas a second aspect of the first test profile (e.g., corresponding properties of the edge or node) is derived from a different closest match among the candidate profiles along a second dimension. Accordingly, the test profile may be based on or derived from one or more than one of the pre-defined profiles.

In one or more embodiments, the comparison against candidate test profiles may include all or some of the following: comparing a subject-verb-target pattern of the data elements of the orphan record to subject-verb-target patterns of each of the pool of candidate test profiles, relating a subject of the data elements of the orphan record to a representative subject of each of the pool of candidate test profiles, relating a verb of the data elements of the orphan record to a representative verb of each of the pool of candidate test profiles, and/or relating a target of the data elements of the orphan record to a representative target of each of the pool of candidate test profiles.

Also or alternatively, all or some of the test profiles may be built using machine learning programs or techniques. For instance, the monitoring device may utilize information from records collected before and after implementation of prior profiles for graph database modeling of the network computing environment to develop correlations between aspects of the prior profiles and an increase or decrease in identity tracing characteristics of the graph database model. For example, if a recent generation of profiles mostly collapsed certain entity subtypes under a single profile in connection with graph database modeling, and the machine learning program observed a decrease in identity-tracing characteristics of the resulting graph database model, the program may note that entities of several subtypes exhibiting similar secondary indicia behavior within the network computing environment may be better modeled separately and independently rather than being collapsed under one profile. Moreover, in one or more embodiments, any change in identity tracing characteristics of the graph database model may be weighed or considered against computational efficiency inherent in such configuration changes within the scope of the present invention.

The machine learning program(s) of the monitoring device may therefore recognize or determine correlations between graph database profile characteristics on the one hand, and identity tracing characteristics of resulting graph database models on the other hand. The machine learning techniques or programs may include curve fitting, regression model builders, convolutional or deep learning neural networks, combined deep learning, pattern recognition, or the like. Based upon this data analysis, the machine learning program(s) may learn method(s) for constructing edge and node profiles for use in building graph database models to optimize identity tracing characteristics and, in one or more embodiments, computational efficiency.

It should be noted that, in supervised machine learning, the program may be provided with example inputs (i.e., prior profiles) and their associated outputs (i.e., better or worse identity tracing characteristics when relied on in modeling), and may seek to discover a general rule that maps inputs to outputs for improved construction of potential test profiles. In unsupervised machine learning, the program may be required to find its own structure in unlabeled example inputs.

The program may utilize classification algorithms such as Bayesian classifiers and decision trees, sets of pre-determined rules, and/or other algorithms to generate test profiles. In one or more embodiments, the recommendation engine illustrated in FIG. 7 generates the test profiles described above.

The monitoring device may accordingly generate a plurality of test profiles for use in modeling the orphan record. Each test profile is unique relative to the others for a given orphan record, entity or relationship, but the uniqueness may extend to only a few or one of the definitional elements of the test profile (or, possibly, to more or even all definitional elements).

Referring to step 604, test graph database models may be built based respectively on each of the test profiles and on the profiles of the pre-matched records. In one or more embodiments, a separate test graph database model is constructed for each of the test profiles based on the respective test profile and the profiles of the pre-matched records. Accordingly, a plurality of test graph database models is built to test efficacy of a single orphan record or corresponding entity or relationship (i.e., node or edge).

It should be noted that, in one or more embodiments, test profiles for multiple orphan entities and/or relationships may be tested together within corresponding test graph database models without departing from the spirit of the present invention. For example, where modeling occurs in batches, a plurality of orphan records—each associated with a plurality of test profiles—may accumulate and be tested together in multiple possible combinations in connection with selecting a new production graph database model (discussed in more detail below). Accordingly, a single test profile may be utilized in a plurality of test graph database models for simultaneous testing and optimization within the scope of the present invention, such as where the test profile is tested with different combinations of test profiles corresponding to other of the orphan entities and/or relationships.

The test graph database models corresponding to the test profiles may be built, for example, by modeling each known node and edge within the network computing environment according to its corresponding pre-defined profile (or test profile, in the case of orphan entities and/or relationships). One of ordinary skill will appreciate that some entities and/or relationships may be excluded or culled from the models, for example where they are known to be relatively inconsequential with respect to identity tracing characteristics and/or computational efficiency (at least in the context of test graph database models for testing the orphan record(s) under review) and to save on computational and/or memory requirements for modeling.

It should also be noted that at least some test profiles may be generated that impinge on or reduce the scope or reach of an existing pre-defined node or edge profile and/or that collapse entirely together with such a pre-defined node or edge profile into a new, more broadly applicable test profile. Accordingly, one or more test graph database models may model at least one entity or relationship from a pre-matched record using a test profile instead of under the originally-matched pre-defined node or edge profile. Likewise, testing one or more test profiles or models may include splitting out or modifying other pre-defined node or edge profiles without departing from the spirit of the present invention.

Referring to step 605, one of the test profiles may be selected based on comparing identity tracing characteristics of the corresponding test graph database model against those of the remaining test graph database models. In one or more embodiments, the monitoring device is at least in part tasked with optimizing identification of certain types of entities or actors within the network computing environment to enhance control by the owner over the environment and threats to system and data integrity and security that may be present therein.

Identity tracing characteristics may include, for example, one or more of: number of non-redundant edges between distinct nodes, number of identifiable entities, level of resolution of identifiable entities, number of activities traceable to at least one identity, visibility for discovery of new identities, minimized number of edge traversals between identity nodes and an edge of interest, low fidelity of model, high retention of model, and low number of edges. In one or more embodiments, aspects of the model that most strongly enrich the relationships between entities may be determined using data dimensionality reduction techniques common to machine learning embedding techniques. As noted above, one of ordinary skill will appreciate that competing concerns over computational and memory requirements on the one hand, and data clarity and resolution (i.e., enriched resolution in the relationships between nodes and edges within the model) on the other hand, may at times bring some identity tracing characteristics into tension with others. However, it has been observed that most environments, when modeled using embodiments of the present invention, will see an improved balance for these identity tracing characteristics.

Examples of identities of interest may include any one or more of the following: unique individual identification, unique account identification, unique IP address identification, unique device identification, unique system identification, or the like. It should be noted that it is generally desirable to provide a more granular identification—for example, by identifying a person rather than an account which may be used by multiple persons that include the person—but that maximum resolution may be unnecessary and/or impossible in certain environments.

The identity tracing characteristics of each of the multiple test graph database models may be compared to those of the others to select the best test graph database model—and, correspondingly, the best test profile(s) under the exemplary embodiment—for use in a production graph database model discussed in more detail below. Returning briefly to FIG. 7, the recommendation engine of the monitoring device may perform the test model evaluation and may select the test profile(s) correlating to the best identity tracing characteristics.

Referring to step 606, the production graph database model may be built using the selected one or more of the test profiles and the pre-defined profiles of the pre-matched records. In one or more embodiments, one or more of the pre-matched and pre-defined profiles may be revised (e.g., collapsed or expanded) and/or deleted to account for the changes to the model flowing from the selected test profile(s), as discussed in more detail above. Further, in one or more embodiments, as with the test graph database models discussed above in connection with steps 604-605, the production graph database model may be built by modeling all or a subset of the entities and relationships enumerated within the network computing environment. Once included in a production graph database model, each selected test profile may be considered one of the pre-defined node and edge profiles for subsequent test iterations and dynamic modeling cycles. Turning briefly to FIG. 7, the model may be representative of the production graph database model hosted and/or managed by the monitoring device.

The production graph database model may be used to model the network computing environment unless and until dynamically updated based on one or more later-selected test profiles and/or other refinements that may continuously or periodically occur. As noted above, the production graph database model may, in embodiments of the present invention, be optimized for providing high entity resolution and for automated expansion to encompass new entity types within new environments, while mitigating the impact of increasing model complexity on computational and memory requirements. Embodiments of the present invention accordingly represent marked improvement over existing technology for dynamic modeling of and intervention into network computing environments.

As illustrated in FIG. 7, the model or representations thereof may be accessible or exposed to an owner or employee at a client device (i.e., the "User Interface") via a secure portal or web portal such as the portal used for enrollment and/or setup of the monitoring service discussed in more detail in preceding sections.

It should be reiterated here that, in one or more embodiments, the monitoring device may instrument the network computing environment to obtain, retrieve and/or generate/expose previously-uncollected or previously-unexposed data. Such instrumentation may rely on access credentials supplied during enrollment by the owner in the monitoring service. For example, the instrumentation may have as its aim the exposure of data relating to creation of a new resource or to occurrence of additional activity of specified type and/or enabling an expanded scope of monitoring of at least one cloud computing account and/or cloud service type. Expanded scope of monitoring may be implemented in response to a determination that the expanded scope is required to analyze activity observed within the network computing environment.

Moreover, the instrumentation may be triggered and/or be responsive to one or more of: (1) a need for additional information to complete selection of one of the first and second test profiles; and (2) a need for additional information to complete the application of the pre-processing rules to compare the data records against the plurality of pre-defined profiles. The additional data collected may be utilized to, for example, support the operations of the heuristics and/or recommendation engine components described in more detail above.

In one or more embodiments, the monitoring device is further configured to enrich the production graph database model. Analyzer(s) comprising programs configured to recognize one or more data types or values—alone or in pre-defined combination(s)—will walk, traverse or otherwise analyze the foundational construction of the production graph database model looking for opportunities to enrich the identity tracing characteristics thereof. More particularly, where the foundational construction (i.e., profiling) is already established via steps 601-606 discussed above, the analyzers may walk the production graph database model looking for additional changes (e.g., additions) to be made to enhance the model for better identity resolution and/or attribution of one or more activities to a given identity. For example, the analyzers may identify occurrence of one or more pre-determined patterns or data types and, based on identifying the occurrence, may enrich or add data to the model. The added data may, for example, comprise adding IP addresses to domain nodes or adding other properties to nodes or edges, generating subgraphs, or adding nodes or edges excluded during initial generation of the production graph database model.

The analyzer(s) may also or alternatively generate a notification for near-term consideration by the owner of the security monitoring service. For example, the analyzer may identify an event in the production graph database model classified as being of concern or interest and may, accordingly, generate a descriptive notification for transmission and display to the owner. The notification may, in one or more embodiments, comprise a narrative discussed elsewhere herein.

The analyzer(s) may additionally perform a transform step operating on one or more narrative(s) derived from the production graph database model, discussed in more detail below. The transform step may include application of one or more grammatical rules at the narrative level to improve readability of the narrative in view of the available data from the production graph database model.

It should be noted that one or more of the analyzer(s) described above may also be customized for use and stored together with the production graph database model. In this manner, the customized analyzer(s) may be dynamically executed with and may form part of the production graph database model.

It should also be noted that all or some of the enrichment and other analyzer operations discussed above may be supported by and/or may require instrumentation of the network computing environment and/or retrieval of other additional data, again as discussed in more detail above.

Further, the narrative(s) generated according to embodiments of the present invention may be ranked according to importance, with such ranking being utilized to prioritize presentation to one or more user(s) at a client device. Still further, the monitoring device may be configured to apply pre-determined rules to rank natural language narratives by level of abstraction, based on a pre-determined priority corresponding to the type of event or activity of interest being reported.

The method may include additional, less, or alternate steps and/or device(s), including those discussed elsewhere herein, unless otherwise expressly stated and/or readily apparent to those skilled in the art from the description.

In one or more central embodiments, for example, the method may include generating or preparing to generate one or more natural language narratives representative of activity, entities and/or relationships embodied in the production graph database model. The monitoring device may be configured to walk or otherwise analyze the production graph database model to identify a region of interest within the model that matches pre-defined criteria. The region of interest may include data elements relating to a prior action or activity occurring within the network computing environment and involving first and second entities. The pre-defined criteria may include one or more pre-determined patterns or data types in the production graph database model that are required to generate a natural language narrative regarding an activity within the network computing environment.

It should be noted that construction of the graph database model described in more detail above and relying on subject-verb-target-oriented formatting, is particularly useful for application of language processing to generate natural language narratives relating activities within the network computing environment. For example, the production graph database model may be constructed with entities correlating to nodes and actions, activities or other relationships correlating to edges, such that language processing rules may more readily recognize directionality, weighting and other properties of edges and more easily generate natural language narratives at least partly comprising sentences having the subject-verb-target format.

The monitoring device may be configured to recognize and copy portions of the production graph database model anticipated to be useful in generating natural language narratives, including without limitation portions that are useful in completing computations required to complete natural language narratives at a high level of abstraction. For example, one or more language processing rules may be configured to generate abstracted natural language narratives representative of activity occurring within the computing network environment at a high (or summary-type) level of abstraction. Such narratives may preferably include a count of the number of occurrences of the activity within a given timeframe, within a given area of the network computing environment, or involving a given entity.

Accordingly, the analyzers may analyze the production graph database model to identify areas likely to include data elements required to support such computations for future narrative generation, and may preemptively pull or copy those portions of the model for future use. In one or more embodiments, this includes capturing a subset of the data or graph elements available in the model, the subset representing a portion of the model filtered according to at least one of identity-based slices, time-based slices and entity-based slices. The filtered data may be further processed through retrieval by the monitoring device of missing or supplemental additional data that may be required or recommended for completing corresponding narrative(s). Such preemptive sampling of the model may improve performance and reduce computational requirements.

Additional embodiments of and uses for natural language narratives in connection with a security monitoring service are discussed in more detail below.

Exemplary Computer-Implemented Method for Narrative-Structured Representation of and Intervention into a Network Computing Environment FIG. 8 depicts a flowchart including a listing of steps of an exemplary computer-implemented method 800 for narrative-structured representation of and intervention into a network computing environment. The steps may be performed in the order shown in FIG. 8, or they may be performed in a different order. Furthermore, some steps may be performed concurrently as opposed to sequentially. In addition, some steps may be optional.

The computer-implemented method 800 is described below, for ease of reference, as being executed by exemplary devices and components introduced with the embodiments illustrated in FIGS. 1-4, 7 and 9. For example, the steps of the computer-implemented method 800 may be performed by the client devices 12, the servers 14, the service device 16 and the network 20 through the utilization of processors, transceivers, hardware, software, firmware, or combinations thereof. However, a person having ordinary skill will appreciate that responsibility for all or some of such actions may be distributed differently among such devices or other computing devices without departing from the spirit of the present invention. One or more computer-readable medium(s) may also be provided. The computer-readable medium(s) may include one or more executable programs stored thereon, wherein the program(s) instruct one or more processing elements to perform all or certain of the steps outlined herein. The program(s) stored on the computer-readable medium(s) may instruct the processing element(s) to perform additional, fewer, or alternative actions, including those discussed elsewhere herein.

Referring to step 801, an enabled action program may be attached to an abstracted natural language narrative. In one or more embodiments, the enabled action program may be automatically constructed in accordance with, and may instruct pre-determined changes to entities or resources discussed in connection with, the computer-implemented method 500 discussed above. Further, the natural language narrative may be constructed based on and in the manner described in connection with the computer-implemented method 600 discussed in more detail above. Still further, the natural language narrative may relate structured data embodied within a production graph database model of a network computing environment in accordance with the description of the computer-implemented methods 500, 600. One of ordinary skill will appreciate, however, that step 601 and subsequent steps of the method 600 may occur independently of and/or may not be preceded by one or more of the steps outlined in connection with the computer-implemented methods 500, 600 without departing from the spirit of the present invention.

In one or more embodiments, the abstracted natural language narrative may be constructed from a subgraph or filtered portion of a production graph database model of a network computing environment, which, again, may be in accordance with the more detailed discussion of method 600 above. Turning briefly to FIG. 9A, a portion or subgraph of the exemplary production graph database model is illustrated. Entities—namely, the person "Jane," computer systems 1 and 2, and website foo.com—are modeled as nodes, and verbs or actions—namely, "logged in" and "visited"—are modeled as edges and/or as relationships between the nodes. Moreover, the exemplary subgraph is limited to a twenty-four (24) hour timeframe. The timeframe limitation may result from user input at a client device, for example, or a pre-defined rule that limits a trailing window according to the type of event or region of interest being reported on.

The abstracted natural language narrative may be constructed using natural language processing rules that, for example, are pre-configured with respect to each type of event or region of interest within a production graph database model. In one or more embodiments, the abstracted language processing rule may specify the timeframe limitation discussed above, the data types and formats to be presented within the abstracted natural language narrative, and the structure of that narrative. In one or more embodiments, the language processing rule(s) are also configured to receive user input (e.g., from client devices) regarding, for example, requests for narratives relating to particular entities or events, timeframes, sub-systems or other aspects of interest, and to adjust generation of the corresponding natural language narratives accordingly.

FIG. 9B illustrates a representation of an exemplary abstracted natural language narrative in the form of an independently manipulable visual display window (in the upper lefthand corner of the figure). The abstracted natural language narrative reflects the natural language processing rule from which it was constructed. For example, the rule directs inclusion of the relevant timeframe encompassing the reported actions, naming of the entity "Jane Smith," abstraction of system login events to a total number of instances (compare against the model region illustrated in FIG. 9A), and abstraction of the event of interest to a high-level category (i.e., abstraction to "connected to a known bad domain"). These entities and actions, activities and/or events are therefore abstracted in pre-determined ways and with respect to pre-determined aspects by the language processing rule, and are strung together using natural language conventions into the abstracted natural language narrative. It should be appreciated that a variety of natural language processing techniques may be used within the scope of the present invention.

Referring to step 802, a representation of the abstracted natural language narrative is generated, the representation including an enabled action link and an abstraction-toggle link. The representation may be visual—such as where it comprises instructions for display of a visual window on a screen display as illustrated in FIG. 9B—or it may comprise a data structure for retrieval by, for example, a client device. In one or more embodiments, the representation is therefore a data structure configured for exposure to and access by a client device, e.g., where retrieval of the representation is enabled via an API responding to a call from the client device.

Returning to FIG. 9B, the links are embedded or hyperlinked with text of or presented adjacent to the natural language narrative within the representation. Accordingly, an owner or employee of a business organization viewing the representation on a screen display of a client device may activate one or more both links by a click of a mouse or other form of selection using a peripheral device of the client device.

The enabled action link is configured to activate an enabled action program. The enabled action program may be configured to implement or initiate one or more pre-determined changes in the behavior and/or capabilities of one or more entities within the network computing environment. As discussed in more detail above, the embedded enabled action program may be selected from among a plurality of candidate enabled action programs. The candidate enabled action programs may represent all possible or plausible actions, restrictions or limitations that may be taken or placed on one or more of the entity(ies) or identity(ies) related to or responsible for the occurrence of the event of interest which gave rise to the natural language narrative.

The monitoring device may be configured to select the linked enabled action program from among the candidate enabled action programs based at least in part on the class or nature of the event of interest (e.g., "connection to a known bad domain") and on which measures or changes are known to favorably address such event(s) within similar network computing environments.

One of ordinary skill will appreciate that generation of the candidate enabled action programs, selection of the enabled action program, corresponding pre-determined changes and other aspects of the generation, activation and impact of enabled action programs may be in accordance with the computer-implemented method 500 described in more detail above.

Returning to FIG. 9B, it should be noted that "Revert" and "Isolate" versions of the enabled action link are both illustrated, which will be discussed in more detail below.

It should also be noted that the abstraction-toggle link may be activated (e.g., at the client device) to retrieve a representation of an unabstracted natural language narrative with reference to the entity or activity the link references, as discussed in more detail below.

Referring to step 803, an unabstracted representation may be retrieved in response to user input activating the abstraction-toggle link. Turning to FIG. 9B, the abstraction-toggle link embedded with the text referencing the "known bad domain" entity may be clicked or otherwise activated for retrieval of the upper righthand independent representation of the figure. This second representation provides additional details from the corresponding region of the production graph database model relating to the domain entity and the event of interest. More particularly, the second representation provides a count for how many connections to the domain entity were made, and names the bad domain entity in the form of a uniform resource locator (URL).

In this manner, embodiments of the present invention provide for smooth, understandable viewing of portions and slivers of the production graph database model, and navigation between independent, manipulable natural language representations of those portions commensurate with varying levels of abstraction and detail relating to involved entities and activities. It should be noted that independent manipulation may include, for example, movement of windows comprising the representation and/or minimization, maximization and/or closure of such windows on the screen display of the client device. One of ordinary skill will also appreciate that multiple levels of abstraction may be navigated or otherwise traversed by a user via respective abstraction-toggle links, and that such traversal may occur in either direction (i.e., whether toward more abstract description or more detailed description, with respect to a particular entity), within the scope of the present invention.

Referring to step 804, pre-determined changes may be automatically implemented within the network computing environment in response to user input activating the enabled action link. Turning to FIG. 9B, the representation of a natural language narrative illustrated in the lower lefthand corner of the figure includes an "Isolate" link. The link is configured to activate the program that implements predetermined isolation measures on the entity(ies) involved in accessing the known bad domain corresponding to the region or event of interest that gave rise to the exemplary natural language narratives. Accordingly, activation of the link will cause the monitoring device to automatically apply or instruct the network computing environment to apply those pre-determined changes and measures.

It should be noted that FIG. 9B illustrates "Isolate" and "Revert" versions of an enabled action program link within respective ones of the natural language narratives. In one or more embodiments, the monitoring device will provide the owner or user of the client device the option of both implementing and (subsequently) reversing the pre-determined changes of the enabled action program within the network computing environment. In each case, the underlying language processing rules may incorporate a description of the isolation and reversion events in subsequent versions of the natural language narratives, as shown in FIG. 9B. Preferably, each implementation or reversal of an enabled action program is automatically and dynamically reflected in the production graph database model from which the natural language narratives are derived. The reversion may be accomplished by an enabled action reversion program executed in response to activation of the corresponding reversion link.

It should also be noted that, in one or more exemplary embodiments, an owner or user of the client device may view a representation of the abstracted natural language narrative, activate the abstraction-toggle link to view a representation of the unabstracted natural language narrative with respect to a represented entity or activity the owner would like additional detail about, and then activate the enabled action program link to implement the pre-determined changes in the network computing environment. This exemplary sequence highlights one aspect of the smooth, understandable viewing of and navigation between independent, manipulable natural language representations of portions of a production graph database model for improved control of system integrity and security according to embodiments of the present invention.

Moreover, in one or more embodiments, the monitoring device will automatically generate an explanation of the criteria that were satisfied by a region of the production graph database model. That is, the explanation may be generated to provide context for why the natural language narratives and/or corresponding enabled action program(s) were presented to the owner or user at all. For example, the lower righthand natural language narrative representation of FIG. 9B is generated from an explanatory language processing rule configured to provide visibility into why the event of interest was flagged, presented, exposed or highlighted to the client device. In the illustrated example, the underlying rule instructed inclusion of additional detail from the region of interest in the production graph database model comprising identification of a specific IP address and time of connection. It should again be noted that processes for walking the production graph database model and identifying regions or events of interest may be substantially in accordance with the steps described above in connection with the computer-implemented methods 500, 600.

The explanatory representation and natural language narrative may be reached through activation of an explanation link from or embedded within one or both of the exemplary abstracted and unabstracted narratives discussed above, as illustrated in FIG. 9B.

The method may include additional, less, or alternate steps and/or device(s), including those discussed elsewhere herein, unless otherwise expressly stated and/or readily apparent to those skilled in the art from the description.

Exemplary Computer-Implemented Method for Targeted Narrative-Structured Representation of a Network Computing Environment FIG. 10 depicts a flowchart including a listing of steps of an exemplary computer-implemented method 1000 for targeted narrative-structured representation of a network computing environment. The steps may be performed in the order shown in FIG. 10, or they may be performed in a different order. Furthermore, some steps may be performed concurrently as opposed to sequentially. In addition, some steps may be optional.

The computer-implemented method 1000 is described below, for ease of reference, as being executed by exemplary devices and components introduced with the embodiments illustrated in FIGS. 1-4, 7 and 9. For example, the steps of the computer-implemented method 1000 may be performed by the client devices 12, the servers 14, the service device 16 and the network 20 through the utilization of processors, transceivers, hardware, software, firmware, or combinations thereof. However, a person having ordinary skill will appreciate that responsibility for all or some of such actions may be distributed differently among such devices or other computing devices without departing from the spirit of the present invention. One or more computer-readable medium(s) may also be provided. The computer-readable medium(s) may include one or more executable programs stored thereon, wherein the program(s) instruct one or more processing elements to perform all or certain of the steps outlined herein. The program(s) stored on the computer-readable medium(s) may instruct the processing element(s) to perform additional, fewer, or alternative actions, including those discussed elsewhere herein.

Referring to step 1001, the network computing environment may be monitored. The 1001 step may be performed at a monitoring device and/or a service device controlled, for example, by a monitoring service, and/or by a client device participating in such a monitoring service.

In one or more embodiments, step 1001 may substantially be performed in accordance with step 501 described above. For example, pursuant to step 501, the monitoring device may collect records relating to entities, resources and/or activity within a network computing environment. In one or more embodiments, the records are data records containing data elements relating to the entities, resources and/or activity. The data records may also comprise structured and labeled data. The records may relate to entities, resources and/or activity in an exemplary network computing environment comprising one or more cloud computing accounts and/or cloud services hosted by a cloud service provider on behalf of a business organization. Exemplary cloud services may include one or more of Infrastructure-as-a-Service (IaaS), Platforms-as-a-Service (PaaS), and Software-as-a-Service (SaaS). The exemplary computing environment may also or alternatively encompass all or part of an internal network of the business organization comprising one or more client devices and resources.

The monitoring device may retrieve the records from one or more data sources including, for example, database(s) managed by the monitoring device and/or by calling an application programming interface (API) with a request for the records. The API may, in one or more embodiments, be managed by a database management system of a client device or server of the business organization and/or of a server of the cloud service provider. The records may be retrieved continuously, intermittently, in response to a trigger and/or the passage of a pre-determined period of time without departing from the spirit of the present invention.

Also or alternatively, the monitoring step 1001 may substantially be performed in accordance with step 601 described above. In one or more embodiments, the monitoring step 1001 also or alternatively includes analyzing a status of or output from a production graph database model of the network computing environment. For example, the production graph database model may be constructed, updated and/or maintained according to the steps of the computer-implemented method 600 described in preceding sections. Monitoring 1001 the production graph database model may include continuously or intermittently comparing aspects or data of the model for changes or circumstances warranting additional action(s), including those described in more detail below.

Notwithstanding the discussion above, it should be noted that step 1001 and subsequent steps of the method 1000 may occur independently of and/or may not be preceded by one or more of the steps outlined in connection with the computer-implemented methods 500, 600 and/or 800 without departing from the spirit of the present invention. For example, other steps for monitoring a network computing environment may be utilized within the scope of the present invention.

It should also be noted that the monitoring step may be preceded and/or triggered by setup for or enrollment by a business organization or client device in the monitoring service. For example, in one or more embodiments an administrative user/employee or "owner" of the service may input instructions into a client device requesting enrollment in the monitoring service. Via user input, the owner may designate or identify, during the service enrollment process, the one or more physical and/or virtual/logical and computing components of the client devices and/or cloud service provider devices and/or the accounts, services and other environmental aspects that together comprise the "network computing environment" to be monitored. The owner may also provide access credentials or instruct or reconfigure corresponding access management framework(s) and permission(s) to permit the monitoring device(s) the requisite access to perform the monitoring service. The owner may further select one or more monitoring services and/or tier(s) of service for application to the network computing environment.

Other aspects of the owner setup process may be conducted in a manner known in the art. The owner setup process may, for example, be conducted via a web interface, mobile application or the like managed by or otherwise in communication with the monitoring device. The program of the monitoring device may prompt the owner to create an account and login credentials, select a service type, enter payment information, and otherwise provide information and input required to set up enrollment and monitoring services of the type(s) discussed herein.

The administrative employee or user may also provide input selecting and/or configuring one or more user roles (and/or, more directly, corresponding preference set(s) discussed in more detail below) within the organization for interaction with and/or exposure to, and/or for organization of notifications, data and/or natural language narratives generated by, the monitoring service. For example, the user roles may permit customized notifications and/or natural language narratives to be transmitted and/or exposed to individual users, as discussed in more detail below.

User roles and/or preference sets may be primarily defined by job titles (e.g., "Chief Technology Officer," "Chief Information Security Officer," "Security Architect," "Cybersecurity Engineer," "Malware Analyst," "Penetration Tester," or the like) and/or may include and/or be based on corresponding job tasks and/or responsibilities within the organization. These responsibilities may be described in one or more definition(s) (e.g., "designs system layout and communication protocols," "defines user permissions," "monitors user and application activity," "oversees digital security team," or the like). The responsibilities may be further defined in a user role by geographic limitations, seniority limitations, network resource limitations, and/or other limitations particular to the user role and/or the individual user assigned to the user role by the organization.

In one or more embodiments, the monitoring service pre-determines a plurality of user roles, each optionally comprising a job title, one or more corresponding job responsibilities and/or definitions, and/or any limitations placed thereon. Also or alternatively, one or more of these aspects of the user roles may be selected by the administrative user. For example, the monitoring service may, during or after enrollment, present the administrative user with a pre-determined list of job titles which the administrative user may select from for implementation in connection with monitoring the network computing environment.

Further, one or more user roles may be customized by the administrative user, for example where the administrative user selects from a list of pre-determined options for job titles, job responsibilities and/or definitions, and any limitations thereon (e.g., geographic, seniority-based, network topography- or resource-based, etc.) to build each user role.

It should also be noted that the monitoring service may define one or more relationships between user roles. For example, in one or more embodiments, the monitoring service may pre-determine reporting chains representing seniority relationships within the organization according to the user roles. The monitoring service may pre-determine the reporting chains for the user roles alone or in cooperation with the administrative or another user of the organization.

In each case, the job title(s), job responsibilities/definitions, limitation(s), and/or reporting chains comprising the user roles may be pre-determined by the monitoring service. For example, in one or more embodiments, the monitoring service may search the Internet and/or other data sources (e.g., social network service(s) and/or one or more job posting database(s)) for related job postings or other job descriptions containing or comprising the job title(s), job responsibilities, definition(s), limitation(s), and/or reporting chains. The monitoring service may utilize an automated natural language processing ("NLP") model (e.g., large language model) and/or manual user input to: (i) extract and/or reconcile a standardized list of job titles; (ii) extract and/or reconcile a standardized list of job responsibilities and/or definitions; (iii) extract and/or reconcile one or more standardized reporting chain(s) relating a job title to at least one other job title and/or a user role to at least one other user role; (iv) extract and/or reconcile a standardized list of limitation(s) associated with each job title, responsibility/definition and/or reporting chain; and/or (v) relate each job title or user role to one or more job responsibilities/definitions, limitation(s), and/or reporting chain(s).

As discussed above, the administrative user may select one or more pre-determined user roles and/or may select from among pre-populated lists of job title(s), job responsibilities/definitions, limitation(s), and/or reporting chains to build and/or customize one or more user roles for implementation by the monitoring service in connection with the network computing environment.

The administrative user may further associate one or more of the user roles with individual user(s) identified to the monitoring service during or after enrollment. Accordingly, in one or more embodiments, communications and/or notifications from the monitoring service may be personalized or targeted to individual users, including as described in more detail below.

For example, the administrative user may, during or after enrollment, identify a plurality of employees of the organization including one or more individual users corresponding to the user roles. The identification may include: (i) providing names or other unique identifiers (such as employee numbers) for each individual user; (ii) providing contact information (e.g., e-mail address, telephone number, or the like) for each of the plurality of employees or individual users; (iii) specifying one or more of a plurality of user roles for each of the identified employees or individual users; and/or (iv) specifying reporting chain(s) between individual users (e.g., where simply specifying user role(s) is insufficient to disambiguate a multitude of options for such reporting relationships). The administrative user may, in one or more embodiments, further customize a user role associated with an individual user, for example by selecting custom job responsibilities/definitions, limitation(s), and/or reporting chains from among pre-populated lists of options discussed above for storage and implementation by the monitoring service.

However, it should also be noted that, in one or more embodiments, the monitoring service may target user roles and expose information (e.g., notifications and/or natural language narratives) organized according to those user roles to one or more client devices without narrowing the medium for communication or otherwise individually notifying user(s). For example, the monitoring service may simply expose natural language narratives and/or other notifications via an API to one or more client devices according to user roles, with the organization controlling individual access according to user roles in its discretion according to internal login and credentialing/permission structures.

Referring to step 1002, data relating to an action performed in the network computing environment may be obtained via the monitoring.

The 1002 process may be performed at the monitoring device and/or a client device, for example by extracting the data from the records and/or graph database model monitored according to step 1001 described above, or otherwise as described above in connection with the aspects of the computer-implemented methods 500, 600 and/or 800 relating to acquisition of data regarding events in the network computing environment.

In one or more embodiments, the data will meet criteria for an "event of interest" and/or "activity of concern," and/or may correspond to a region of interest within a graph database model of the network computing environment, in each case respectively discussed in more detail above in connection with computer-implemented method 800 and the system description of embodiments of the present invention. Moreover, such criteria may depend on, vary based on, and/or be contingent on the user role(s) of the organization set up within the monitoring service. For example, where an organization enrolls three (3) individual users or individual user types corresponding to three (3) different user roles, criteria associated with those three (3) user roles may be implemented for comparison against the data obtained from the graph database model and/or more directly from the network computing environment, whereas criteria associated with other (unselected) user roles may not be utilized for such comparisons.

Moreover, the data relating to the action may be obtained and/or supplemented via the one or more analyzer(s) observing the network computing environment and/or a graph database model representing same, in accordance with computer-implemented method 600 (e.g., step 606).

Notwithstanding the above, it should be noted that step 1002 may occur independently of and/or may not be preceded by one or more of the steps outlined in connection with the computer-implemented methods 500, 600 and/or 800 without departing from the spirit of the present invention.

Referring to step 1003, a first preference set may be selected from a plurality of preference sets. Each of the preference sets may correspond to a respective one of the plurality of user roles. The first preference set may include a first structural narrative definition configured for the corresponding user role. The 1003 process may be performed at the monitoring device and/or a client device, and the selection may be made by such a device automatically and/or via manual input from one or more administrative organization user(s).

One or more of the preference sets may be selected for each user role for which a natural language narrative will or may be generated, pursuant to the detailed description below. Moreover, multiple user roles may be selected with respect to a given action detected in the network computing environment.

For example, a first user role may comprise the job title "Chief Information Security Officer (CISO)," whereas a second user role may comprise the job title "(Junior) Cybersecurity Analyst." The first user role may be related to the second user role by a reporting chain in which the second user role reports to the first user role and/or to an intermediate manager who reports to the first user role. The first user role may define significant staff oversight, maintenance of relationships with external entities at the highest levels, high decisional autonomy, widespread geographic and network topographical reach, and low resolution/high importance thresholds and visibility into events or actions occurring within the network computing environment. By contrast, the second user role may define little to no staff oversight, interaction with external entities and other individual users of relatively low seniority, low decisional autonomy, narrowed geographic and/or network topographical reach within a topic area, and high resolution/low importance thresholds and visibility into events or actions occurring with the network computing environment.

The one or more structural narrative definitions corresponding to each selected preference set may map the features of the corresponding user role to aspects of one or more natural language narrative(s) to be generated as described herein. Each such natural language narrative may be generated in view of length constraints, technical complexity constraints, fact type constraints, seniority/access/responsibility constraints, and other constraints, as well as in view of various syntax and grammatical rules configured for the user role, in each case defined by the structural narrative definitions. Moreover, each such natural language narrative may be attached to one or more enabled action programs according to the structural narrative definitions.

In one or more embodiments, the structural narrative definitions comprise input to the NLP model generating the natural language narratives discussed herein. The structural narrative definitions may be used together with and/or may comprise the natural language processing rules discussed elsewhere herein as input for generating natural language narratives.

In each case, the one or more structural narrative definitions corresponding to a given preference set for a user role may provide rules and guidelines to the NLP model for generating natural language narratives directed to or for the consumption of individual users filling the user role.

In an example, the structural narrative definitions corresponding to the preference set(s) for the CISO user role may provide the framework to the NLP model for generating natural language narratives describing the action within the network computing environment in a manner configured for consumption by the CISO. The CISO natural language narrative(s) may accordingly: be generated at a high level of abstraction (e.g., by including counts of related events/actions across the entire network computing environment and topography, omitting details regarding all but the most critical event(s)/action(s)); be shorter and more condensed; omit technical support contact information for third parties (e.g., with such information being more appropriately directed to individual users filling user role(s) of lower seniority); propose escalation of a threshold level; be attached to enabled action program(s) having more wide-ranging significance than those offered to individual users filling user role(s) of lower seniority; and/or include the use of higher complexity technical terminology appropriate for seasoned personnel.

In contrast, the structural narrative definitions corresponding to the preference set(s) for the (Junior) Cybersecurity Analyst user role may provide the framework to the NLP model for generating natural language narratives describing the action within the network computing environment in a manner configured for consumption by the Analyst. The Analyst natural language narrative(s) may accordingly: be generated at a lower level of abstraction (e.g., by including details regarding aspects of event(s)/action(s) within the limited purview of the Analyst); be longer and more drawn out; include technical support contact information for third parties and/or internal resources for addressing the event(s)/action(s) on a granular level; propose escalation below senior management levels; be attached to enabled action program(s) having more narrow and focused significance; and/or include less complex technical language and/or provide additional resources, references and/or definitions for interpreting complex technical language.

In this manner, the one or more structural narrative definitions corresponding to a given preference set for a user role provide rules and guidelines to the NLP model for generating natural language narratives directed to or for the consumption of individual users filling the user role.

It should also be noted that organizational metadata may be attached to the structural narrative definitions, preference sets, job title(s), job responsibilities/definitions, limitation(s), and/or reporting chains, in any combination, to enhance ease of use of the monitoring service. The organizational metadata may be used to statically and/or dynamically group any combination of the foregoing aspects.

More particularly, the organizational metadata may relate one of the structural narrative definitions, preference sets, job title(s), job responsibilities/definitions, limitation(s), and/or reporting chains to any other, such that selection of the one by the monitoring service and/or administrative user during user role construction/definition weighs in favor of (or, conversely, against) presentation or selection of the other one in construction of a given user role.

For example, where a first aspect of a structural narrative definition (e.g., defining the type and/or scope of enabled action program(s) corresponding to a user role) is typically implemented successfully with a second aspect of a structural narrative definition (e.g., defining the level of granularity with which event(s)/action(s) should be described for the user role), selection of the first aspect of the structural narrative definition may cause the monitoring service to reference the attached organizational metadata and, accordingly, preferentially select or offer up the corresponding second aspect for inclusion in the structural narrative definition for the user role under construction.

For another example, where a given job title is typically seen with a third aspect of a structural narrative definition—such as where the job title of CISO is typically seen with an aspect of the structural narrative definition defining unlimited purview of the network computing environment—selection of the CISO job title may cause the monitoring service to reference the attached organizational metadata and, accordingly, preferentially select or offer up the corresponding third aspect for inclusion in the structural narrative definition for the CISO user role under construction.

For yet another example, where a first job responsibility is typically seen with another job responsibility, typically implies a subordinate or supervisory relationship to another job title or role, or is typically discharged within certain limitations (e.g., within a given region or portion of the organization), selection of the first job responsibility may cause the monitoring service to reference the attached organizational metadata and, accordingly, preferentially select or offer up the corresponding job title or role, limitation(s), and/or reporting chain for inclusion in the user role under construction.

For still yet another example, where a first job title is infrequently seen with a given job responsibility, typically implies the absence of a subordinate or supervisory relationship to another job title or role, or is infrequently discharged with certain limitations, selection of the first job title may cause the monitoring service to reference the attached organizational metadata and, accordingly, exclude from selection or offering up of the corresponding job title or role, limitation(s) and/or reporting chain in connection with the user role under construction.

In one or more embodiments, the organizational metadata attached to the structural narrative definitions, preference sets, job title(s), job responsibilities/definitions, limitation(s), and/or reporting chains of the monitoring service is generated and/or derived from the automated NLP model (e.g., large language model) and/or manual user input used to extract and/or reconcile standardized structural narrative definitions, preference sets, job titles, responsibilities/definitions and/or reporting chain(s), as discussed in more detail above.

Further, whereas the present disclosure may treat structural narrative definitions, preference sets, job title(s), job responsibilities/definitions, limitation(s), and/or reporting chains separately, it is foreseen that one or more such aspects of user roles may be combined in whole or in part within the scope of the present invention. For example, a structural narrative definition may directly reference a reporting chain of a user role to populate contact information for an enabled action program providing for escalation to a more senior individual user. For another example, a structural narrative definition may directly reference a limitation of a user role to provide the definition necessary for the NLP model to generate natural language narrative(s) corresponding to the limitation. Moreover, the preference set(s) may include selection(s)/alteration(s) of modular and/or standardized structural narrative definitions specific to individual user(s), and/or may simply consist of such standardized structural narrative definitions within the scope of the present invention.

One of ordinary skill will appreciate from the discussion above that modularity and organizational metadata may be used to enhance ease of use and flexibility in user role definition/construction by the monitoring service and/or administrative user(s). However, computational efficiency and/or automation may be promoted by collapsing one or more aspects of the user role(s) and/or structural narrative definition(s) without departing from the scope of the present invention.

Referring to step 1004, a first natural language narrative describing the action based on the first structural narrative definition corresponding to the selected first preference set may be generated. Additional natural language narratives exhibiting different levels of abstraction may also be generated based on the selected first preference set.

The 1004 step may be performed at the monitoring device and/or a client device implementing, e.g., the NLP model, and taking the first preference set corresponding to the user role as input. The first preference set may comprise, and/or the input to the NLP model may otherwise include, one or more natural language processing rules discussed elsewhere herein. It should also be noted that preference sets, structural narrative definitions and/or natural language processing rules described herein as comprising input to an NLP model may also or alternatively comprise or be described as constituting integral portion(s) of the NLP model(s) within the scope of the present invention.

Natural language narratives of computer-implemented method 1000 may be generated generally in accordance with computer-implemented method 800 discussed above and/or as illustrated in FIG. 9. However, it should be noted that step 1004 may occur independently of and/or may not be preceded by one or more of the steps outlined in connection with the computer-implemented methods 500, 600 and/or 800 without departing from the spirit of the present invention.

One of ordinary skill will appreciate that the NLP model or other means for generating the natural language narratives described herein may take as input one or more pre-existing or initial narrative(s), data from records or the like collected from and/or regarding activities/actions and/or entities within the network computing environment discussed in more detail above, and/or data and/or metadata of a graph database model of the network computing environment also described in more detail above, within the scope of the present invention.

The first natural language narrative may be generated by an NLP model taking as input one or more initial natural language narratives, wherein the generation includes summarizing data extracted from the one or more initial natural language narratives as required by the first structural narrative definition. For example, generating the first natural language narrative according to the first preference set may include summarizing and/or abstracting a fact having a fact type from each of the initial natural language narratives. The abstraction may include representing a plurality of instances of occurrence of the fact type within the plurality of the initial natural language narratives as a count in the first natural language narrative.

For example, a plurality of initial natural language narratives may be generated for review by the Analyst of the second user role, according to a second preference set corresponding to the second user role. The initial natural language narratives may provide granular and detailed descriptions of a plurality of actions or events having the same fact type in the network computing environment (e.g., being within the same event or entity category, such as "unauthorized access events" or "database resources"). In turn, the NLP model may take the selected first preference set corresponding to the CISO user role as input, together with the plurality of initial natural language narratives—each describing a different instance of the actions or events having the fact type—to synthesize the first natural language narrative, which comprises a summary of the plurality of corresponding actions or events for the CISO taken at a higher level of abstraction. The first natural language narrative may therefore omit a variety of details, one or more lower-level enabled action programs and/or other aspects originally included in the initial natural language narratives, and may add other aspects (e.g., higher-level enabled action program(s)). The first natural language narrative may also abstract the plurality of actions or events into a summary count of actions or events of the corresponding fact type.

The first structural narrative definition may also include or require one or more of the following: identity-based slices of the graph database model, time-based slices of the graph database model; and entity-based slices of the graph database model. For example, where the first structural narrative definition is configured for generation of natural language narratives to be reviewed by the CISO, it may require a wider time-based slice of the graph database model corresponding to a broader scope of events.

The structural narrative definition(s) corresponding to a user role may themselves integrate permissions corresponding to data access and/or intervention into the network computing environment (e.g., via enabled action programs). For example, a level of access and/or intervention rights may be inherent in a user role type; that is, if the administrative user of the organization assigns a user role to an individual user, the monitoring service assumes that assigned individual user has pre-determined access and/or intervention rights corresponding to the user role and defined in the structural narrative definition(s) for that user role. However, in one or more embodiments, the structural narrative definition may include a pointer or other reference to a permissions store or other role definition database maintained by the monitoring service and/or the organization, such that the NLP model may consult the database for permission(s) corresponding to each individual user as a pre-condition for including one or more data or fact type(s) and/or enabled action program(s) in natural language narrative(s) to be exposed to that individual user.

A second natural language narrative (and, optionally, additional natural language narratives) may also be generated based on a second preference set corresponding to a second user role. The second preference set corresponding to the second user role may be selected from the plurality of preference sets that also includes the first preference set for the first user role. The second preference set includes a second structural narrative definition different from the first structural narrative definition.

Continuing with examples provided above, the second natural language narrative may be generated for the exemplary Analyst user role. The exemplary second preference set and second structural narrative definition include significantly different directives for generating natural language narratives than the exemplary first preference set and the first structural narrative definition corresponding to the CISO. In one or more embodiments, the first structural narrative definition requires at least one of: (i) inclusion of a fact type in the first natural language narrative that is not required to be included in the second natural language narrative by the second structural narrative definition; (ii) abstraction of a fact in the first natural language narrative that is not required for the second natural language narrative by the second structural narrative definition; (iii) attachment of an enabled action program to the first natural language narrative that is not required to be attached to the second natural language narrative by the second structural narrative definition; and/or (iv) additional detail regarding a fact type relative to the second structural narrative definition.

Notwithstanding the discussion above, one of ordinary skill will appreciate that, in one or more embodiments, structural narrative definition(s) for respective first and second user roles need not differ along more than one dimension or with respect to more than one aspect or fact type. For example, closely similar user roles—while defined distinctly by the monitoring service—may only vary with respect, for example, to a single enabled action program, a single degree of abstraction with respect to a single fact type, a single grammatical or syntactic directive, or the like. Accordingly, fine gradations between user roles are possible within embodiments of the present invention.

As noted above, a second natural language narrative (and, optionally, additional natural language narratives) describing the action may accordingly be generated (e.g., by the NLP model) based on the selected second preference set corresponding to the second user role.

Referring to step 1005, a representation of the first natural language narrative may be exposed or provided to an individual user assigned to the first preference set (either directly or via reference to the first user role of the plurality of user roles corresponding to the first preference set). In one or more embodiments, the second natural language narrative may be exposed or provided to a second individual user assigned to the second user role of the plurality of user roles corresponding to the second preference set. The step 1005 may be performed at the monitoring device and/or a client device, for example where the monitoring device transmits a representation of the first natural language narrative to the client device associated with the individual user assigned to the first user role for viewing.

The step 1005 may be carried out in accordance with step 802 discussed in detail above. For example, the representation may include one or more links, and may be visual—such as where it comprises instructions for display of a visual window on a screen display as illustrated in FIG. 9B—or it may comprise a data structure for retrieval by, for example, a client device. In one or more embodiments, the representation is therefore a data structure configured for exposure to and access by a client device, e.g., where retrieval of the representation is enabled via an API responding to a call from the client device.

The individual user exposed or provided a respective one of the first and second natural language narratives may, for example, manipulate a window in which the representation is contained and/or select one or more enabled action program link(s) and/or abstraction-toggle link(s) of the natural language narrative, in each case in accordance with the discussion of computer-implemented method 800 above.

One of ordinary skill will appreciate that related functions or steps discussed above in connection with one or more of computer-implemented methods 500, 600, 800 may be executed or taken with the steps of the method 1000 within the scope of the present invention. One of ordinary skill will also appreciate that one or all steps of computer-implemented methods 500, 600, 800 may be excluded or omitted from the method 1000 without departing from the scope of the present invention.

It should be reiterated that a central goal of embodiments of the present invention is to provide a technological mechanism for improved intervention in the network computing environment. In one or more preferred embodiments, the mechanism is employed within network computing environments modeled on production graph database models and relying on natural language narratives for enhanced entity resolution. This presents an improved method for providing visibility into operation of resources within the network computing environment and the ability for owner(s) or others administrating or participating in utilization of monitoring service(s) to review the state and events of a network computing environment with improved efficiency and to intervene in pre-determined and system-specific ways to preserve, for example, system integrity and security.

The method may include additional, less, or alternate steps and/or device(s), including those discussed elsewhere herein, unless otherwise expressly stated and/or readily apparent to those skilled in the art from the description. For example, machine learning techniques may be applied to the problem of determining how to construct, revise and/or select preference set(s) for individual user(s) and/or user role(s), which may improve or lead to an increased role for automation of such changes.

The machine learning program(s) of the monitoring device may therefore recognize or determine correlations between, on the one hand, the preference set assigned to an individual and/or one or more aspect(s) or definition(s) of such a preference set, and, on the other hand, successful navigation of corresponding narrative(s) and/or successful risk management by the individual as determined along one or more of a variety of measurable data metrics.

The machine learning techniques or programs may include curve fitting, regression model builders, convolutional or deep learning neural networks, combined deep learning, pattern recognition, or the like. Based upon this data analysis, the machine learning program(s) may learn method(s) for constructing, revising and/or selecting preference set(s) for individual user(s) and/or user role(s).

It should be noted that, in supervised machine learning, the program may be provided with example inputs (i.e., a preference set or corresponding aspect or definition thereof) and their associated outputs (i.e., better or worse user navigation and/or risk mitigation), and may seek to discover a general rule that maps inputs to outputs for improved construction, revision and/or selection of preference set(s) for individual user(s) and/or user role(s). In unsupervised machine learning, the program may be required to find its own structure in unlabeled example inputs.

The program may utilize classification algorithms such as Bayesian classifiers and decision trees, sets of pre-determined rules, and/or other algorithms to generate the correlations and insights discussed above.

Exemplary Computer-Implemented Method for Feedback-Driven Narrative-Structured Representation of a Network Computing Environment FIG. 11 depicts a flowchart including a listing of steps of an exemplary computer-implemented method 1100 for feedback-driven narrative-structured representation of a network computing environment. The steps may be performed in the order shown in FIG. 11, or they may be performed in a different order. Furthermore, some steps may be performed concurrently as opposed to sequentially. In addition, some steps may be optional.

The computer-implemented method 1100 is described below, for ease of reference, as being executed by exemplary devices and components introduced with the embodiments illustrated in FIGS. 1-4, 7 and 9. For example, the steps of the computer-implemented method 1000 may be performed by the client devices 12, the servers 14, the service device 16 and the network 20 through the utilization of processors, transceivers, hardware, software, firmware, or combinations thereof. However, a person having ordinary skill will appreciate that responsibility for all or some of such actions may be distributed differently among such devices or other computing devices without departing from the spirit of the present invention. One or more computer-readable medium(s) may also be provided. The computer-readable medium(s) may include one or more executable programs stored thereon, wherein the program(s) instruct one or more processing elements to perform all or certain of the steps outlined herein. The program(s) stored on the computer-readable medium(s) may instruct the processing element(s) to perform additional, fewer, or alternative actions, including those discussed elsewhere herein.

Referring to step 1101, the network computing environment may be monitored. The 1101 step may be performed at a monitoring device and/or a service device controlled, for example, by a monitoring service, and/or by a client device participating in such a monitoring service.

In one or more embodiments, step 1101 may substantially be performed in accordance with one or more of steps 501, 601 and 1001 described above. Nonetheless, it should be noted that step 1101 and subsequent steps of the method 1100 may occur independently of and/or may not be preceded by one or more of the steps outlined in connection with the computer-implemented methods 500, 600 and/or 800 without departing from the spirit of the present invention. For example, other steps for monitoring a network computing environment may be utilized within the scope of the present invention.

It should also be noted that the monitoring step 1101 may be preceded and/or triggered by setup for or enrollment by a business organization or client device in the monitoring service, which may, again, be substantially in accordance with the description provided in connection with step 1001 above or otherwise throughout the present disclosure. For example, in one or more embodiments the enrollment process may include construction of one or more user roles, including through definition of one or more of standardized structural narrative definitions, preference sets, job titles, responsibilities/definitions and/or reporting chain(s) by the monitoring service and/or via manual input of the administrative user.

In one or more embodiments, the enrollment process includes identification by an administrative user, during or after enrollment, of a plurality of employees of the organization including one or more individual users. The identification may include: (i) providing names or other unique identifiers (such as employee numbers) for each individual user; (ii) providing contact information (e.g., e-mail address, telephone number, or the like) for each of the plurality of employees or individual users; (iii) specifying one or more of a plurality of user roles for each of the identified employees or individual users; and/or (iv) specifying reporting chain(s) (e.g., supervisory relationships) between individual user(s) and/or specifying a hierarchy of trust or verification (e.g., regardless of seniority, specifying trusted user(s) who may serve as reference or verification points for defining user role(s), verifying user activity(ies) or otherwise assisting the monitoring service with managing individual user(s) and/or network activity).

Referring to step 1102, data relating to an action performed in the network computing environment may be obtained via the monitoring.

The 1102 step may be performed at the monitoring device and/or a client device, for example by extracting the data from the records and/or graph database model monitored according to step 1001 and/or 1101 described above, or otherwise as described above in connection with the aspects of the computer-implemented methods 500, 600, 800 and/or 1100 relating to acquisition of data regarding events in the network computing environment.

In one or more embodiments, the data will meet criteria for an "event of interest" and/or "activity of concern," and/or may correspond to a region of interest within a graph database model of the network computing environment, in each case respectively discussed in more detail above in connection with computer-implemented method 800 and the system description of embodiments of the present invention.

Moreover, such criteria may depend on, vary based on, and/or be contingent on the user role(s) of the organization set up within the monitoring service, as discussed in more detail in connection with computer-implemented method 1000 above.

Moreover, the data relating to the action may be obtained and/or supplemented via the one or more analyzer(s) observing the network computing environment and/or a graph database model representing same, in accordance with computer-implemented method 600 (e.g., step 606).

Notwithstanding the above, it should be noted that step 1102 may occur independently of and/or may not be preceded by one or more of the steps outlined in connection with the computer-implemented methods 500, 600, 800 and/or 1000 without departing from the spirit of the present invention.

Referring to step 1103, an initial natural language narrative describing the action may be generated. Additional natural language narratives exhibiting different levels of abstraction may also be generated that describe the action.

The 1103 step may be performed at the monitoring device and/or a client device implementing, e.g., the NLP model, and taking one or more of preference set(s) and/or structural narrative definition(s) corresponding to a user role, natural language processing rules, or the like as input. It should also be noted that preference sets, structural narrative definitions and/or natural language processing rules described herein as comprising input to an NLP model may also or alternatively comprise or be described as constituting integral portion(s) of the NLP model(s) within the scope of the present invention.

Initial natural language narratives of computer-implemented method 1100 may be generated generally in accordance with computer-implemented methods 800 and/or 1000 discussed above and/or as illustrated in FIG. 9. However, it should be noted that step 1103 may occur independently of and/or may not be preceded by one or more of the steps outlined in connection with the computer-implemented methods 500, 600, 800 and/or 1000 without departing from the spirit of the present invention.

The NLP model or other means for generating the initial natural language narratives described herein may take as input one or more pre-existing narrative(s), data from records or the like collected from and/or regarding activities/actions and/or entities within the network computing environment discussed in more detail above, and/or data and/or metadata of a graph database model of the network computing environment also described in more detail above, within the scope of the present invention. Accordingly, generating the initial natural language narrative may include extracting at least some of the data relating to the action from a graph database model representing the network computing environment.

The initial natural language narrative may be generated by an NLP model taking as input one or more pre-existing natural language narratives. For example, generating the initial natural language narrative may include summarizing data extracted from the one or more pre-existing natural language narratives. More particularly, generating the initial natural language narrative may include summarizing and/or abstracting a fact having a fact type from each of the pre-existing natural language narratives. The abstraction may include representing a plurality of instances of occurrence of the fact type within the plurality of the pre-existing natural language narratives as a count in the initial natural language narrative, including as described above in connection with computer-implemented method 1000.

The initial natural language narrative may also include or be constructed based on one or more of the following: identity-based slices of the graph database model, time-based slices of the graph database model; and entity-based slices of the graph database model. Further, generating the initial natural language narrative may include executing an analyzer configured to analyze the action and, based on the analysis, extract additional data from the network computing environment and add the additional data to the graph database model.

Notwithstanding the above, it should be noted that step 1103 may occur independently of and/or may not be preceded by one or more of the steps outlined in connection with the computer-implemented methods 500, 600, 800 and/or 1000 without departing from the spirit of the present invention.

Referring to step 1104, a representation of the initial natural language narrative may be exposed or provided to an individual user. The step 1104 may be performed at the monitoring device and/or a client device, for example where the monitoring device transmits a representation of the initial natural language narrative to the client device associated with the individual user for viewing.

The step 1104 may be carried out in accordance with step 802 and/or 1005 discussed in detail above. For example, the representation may include one or more links, and may be visual—such as where it comprises instructions for display of a visual window on a screen display as illustrated in FIG. 9B—or it may comprise a data structure for retrieval by, for example, a client device. In one or more embodiments, the representation is therefore a data structure configured for exposure to and access by a client device, e.g., where retrieval of the representation is enabled via an API responding to a call from the client device. However, it should be noted that step 1104 may occur independently of and/or may not be preceded by one or more of the steps outlined in connection with the computer-implemented methods 500, 600, 800 and/or 1000 without departing from the spirit of the present invention.

Referring to step 1105, input from the individual user may be received in response to the initial natural language narrative.

The step 1105 may be performed at the monitoring device and/or a client device, for example where the client device receives input from the individual user via a peripheral device (e.g., a mouse or keyboard) in electrical communication with the client device, and the client device transmits the input or corresponding/representative data to the monitoring device.

The individual user exposed to or provided the initial natural language narrative may, for example, manipulate a window in which the representation is contained and/or select one or more enabled action program link(s) and/or abstraction-toggle link(s) of the initial natural language narrative, in each case in accordance with the discussion of computer-implemented method 800 above and as described in more detail below.

It should also be noted that the individual user input responsive to exposure to the initial natural language narrative may include selection of one or more explicit prompts to the individual user. For example, a prompt may specify the option of retrieving/generating additional contextual information regarding why the initial natural language narrative was exposed or provided in the first place (e.g., the explanatory representation shown in the lower righthand portion of FIG. 9B, generated by an explanatory language processing rule configured to provide visibility into why the event of interest was flagged, presented, exposed or highlighted to the client device and discussed in more detail above in connection with computer-implemented method 800). For another example, the prompt may invite the individual user to provide user input indicating the individual user does not comprehend one or more aspects of the initial natural language narrative and/or is undecided on how to act in view of same.

As noted above, additional natural language narratives exhibiting different levels of abstraction and/or different aspects of the action may also be generated. In one or more embodiments, the individual user may activate one or more abstraction-toggle links to navigate between multiple such natural language narratives, and/or may activate one or more corresponding enabled action program link(s). The client device and/or monitoring device may record or track these various forms of user input to the monitoring service and, optionally, may associate such stored input with the corresponding natural language narratives or aspects thereof that provoked the input or to which the input is responsive. In this manner, the client device and/or monitoring device may record and/or track behavior of the individual user relative to information exposed to the individual user, including patterns of behavior across one or more initial and/or additional natural language narratives.

The user input may be tracked when provided directly to the monitoring service and/or to other applications or programs (e.g., executed on the client device or another registered device of the individual user). The user input may: comprise entry and/or selection of one or more search strings for retrieval of information about the network computing environment and/or about aspect(s) of the action or event; comprise entry of text via a word processing or similar application; cause navigation of a menu or tree structure or index of information regarding the network computing environment and/or action or event; comprise use of an application configured for communication with other individual users (e.g., via email or SMS message); and/or may comprise other user input within the scope of the present invention.

Accordingly, the client device and/or the monitoring device may include an application or program configured to monitor for individual user input (e.g., at the client device and/or another device or account registered to the individual user by the monitoring service) related or responsive to exposure to the initial natural language narrative describing the action. The input monitoring program may be configured to record and track user input following exposure to the representation of the initial natural language narrative for a certain period of time and/or until a triggering event cuts or sufficiently devalues subsequent input.

For example, the input monitoring program may be configured to track input from the individual user for analysis hereunder following exposure to the initial natural language narrative and/or additional natural language narrative(s): until a session of the user ends; for a pre-determined period of time; until the individual user is presented with a revised natural language narrative as discussed below; until the individual user input is automatically determined (e.g., using one or more data dictionaries, a NLP model, or the like) to be unrelated to the action or event and/or to the initial natural language narrative and/or to the fact type(s) represented therein; and/or until other criteria are met.

Referring to step 1106, a revised natural language narrative relating to the action may be generated based at least in part on the input from the individual user.

The 1106 step may be performed at the monitoring device and/or a client device implementing, e.g., the NLP model, and taking one or more of preference set(s) and/or structural narrative definition(s) corresponding to a user role, natural language processing rules, or the like as input. It should also be noted that preference sets, structural narrative definitions and/or natural language processing rules described herein as comprising input to an NLP model may also or alternatively comprise or be described as constituting integral portion(s) of the NLP model(s) within the scope of the present invention.

Revised natural language narratives of computer-implemented method 1100 may be generated generally in accordance with computer-implemented methods 800 and/or 1000 discussed above and/or as illustrated in FIG. 9. However, it should be noted that step 1106 may occur independently of and/or may not be preceded by one or more of the steps outlined in connection with the computer-implemented methods 500, 600, 800 and/or 1000 without departing from the spirit of the present invention.

The NLP model or other means for generating the revised natural language narratives described herein may take as input one or more pre-existing narrative(s) and/or the initial natural language narrative, data from records or the like collected from and/or regarding activities/actions and/or entities within the network computing environment discussed in more detail above, and/or data and/or metadata of a graph database model of the network computing environment also described in more detail above, within the scope of the present invention. Accordingly, generating the revised natural language narrative may include extracting at least some of the data relating to the action from a graph database model representing the network computing environment.

In one or more embodiments, the revised natural language narrative is automatically generated in response to individual user input selecting a prompt presented with the initial natural language narrative. For example, where the prompt invites the individual user to indicate a lack of comprehension and/or a state of indecision, one or more revised natural language narrative(s) may be generated according to a language processing rule assigned to and/or configured for the corresponding prompt. Selection of a prompt reflecting lack of comprehension may trigger retrieval of the corresponding language processing rule requiring use of less complex terminology and/or syntax. Selection of a prompt reflecting indecision may trigger retrieval of the corresponding language processing rule requiring a summary of success metrics for prior similar event(s) in which the enabled action program proffered with the initial natural language narrative was implemented. In each case, the revised natural language narrative(s) may be generated using the retrieved language processing rule corresponding to the selected prompt.

Further, in one or more embodiments, the individual user may be invited to provide direct guidance for use by the monitoring service in generating the revised natural language narrative. For example, the monitoring service may offer a plurality of prompts asking the individual user to select any one or more of the following revisions for incorporation into the revised natural language narrative: (i) attach a new or different enabled action program to the revised natural language narrative; (ii) generate the revised natural language narrative based on a different preference set than an initial preference set used to generate the initial natural language narrative; (iii) generate the revised natural language narrative based on an explanatory language processing rule configured to include one or more facts in the revised natural language narrative regarding criteria met by the action causing the action to be categorized as an event of interest or the like; (iv) generate the revised natural language narrative by expanding or abstracting a fact type represented in the initial natural language narrative; and (v) generate the revised natural language narrative by changing an identity-, time- or entity-slice of a graph database model on which the initial natural language narrative was based.

In one or more embodiments, the monitoring service may automatically analyze the individual user input responsive or otherwise relating to the initial natural language to determine and/or select one or more of the revisions listed above and/or one or more preference set(s) and/or structural narrative definition(s) corresponding to a user role, natural language processing rules, or the like for use in generating the revised natural language narrative.

For example, the monitoring service may analyze a pattern exhibited by the individual user when navigating/toggling between the initial natural language narrative and the additional natural language narratives to determine that a particular fact type (e.g., a particular entity type or a particular time-slice) is pursued more frequently and/or is otherwise considered more meaningful than another by the individual user, that a particular level of abstraction is insufficient with respect to a fact type, that fewer or more fact type(s) are desired, and/or other implicit preferences or difficulties of the individual user that may be gleaned from considering the individual user input(s), alone or together with the information presented with the initial natural language narrative and/or additional natural language narrative(s).

For another example, where analysis of the individual user input reveals review by the individual user of fact type(s) and/or level(s) of abstraction immediately prior to activation of an enabled action program link, the monitoring service may determine that the more heavily reviewed fact type(s) and/or level(s) of abstraction are particularly meaningful or useful to the individual user.

For still another example, where the input monitoring program records individual user input to other registered application(s) and/or program(s) (such as web search engine(s), word processing application(s), or the like), such input may also be analyzed by the monitoring service. The individual user may enter search strings into a web search engine relating to terminology used in the initial natural language narrative (e.g., revealing that the terminology and/or syntax are too complex or technical), may enter text notes into a word processing application relating to the fact type(s) used in the initial natural language narrative (e.g., revealing that some of the fact type(s) are more meaningful for the individual user's assessment than others), or otherwise provide input that may be analyzed to guide generation of the revised natural language narrative.

In this manner, the monitoring service may analyze individual user input for pattern(s) and/or actionable relationship(s) to the information presented in the initial natural language narrative and/or additional natural language narrative(s) to determine and/or select one or more preference set(s) and/or structural narrative definition(s) corresponding to a user role, natural language processing rules, or the like for use in generating the revised natural language narrative.

Further, in one or more embodiments, the monitoring service may, based on any one or more of the individual user inputs described above, generate and transmit a notification or message prompting input from another, supervisory or otherwise more trusted individual user. For example, the individual user input responsive or related to the initial natural language narrative may be analyzed and the monitoring service may determine based thereon that improved representation of the network computing environment to the individual user may include changes subject to supervisor input. The notification or message may be addressed or transmitted according to reporting chain(s) and/or contact information provided by the administrative user during, after and/or in connection with setup, as discussed in more detail above.

For example, in one or more embodiments, the notification or message includes a description of the initial natural language narrative, the individual user and/or the individual user input. The notification may include an explanatory natural language narrative describing or including all or part of the initial natural language narrative and the input from the individual user. The notification or message may be configured with one or more prompts inviting the supervisory user to select one or more of the following options informing generation of the revised natural language narrative: (i) attach a new or different enabled action program to the revised natural language narrative; (ii) generate the revised natural language narrative based on a different preference set than an initial preference set used to generate the initial natural language narrative; (iii) generate the revised natural language narrative based on an explanatory language processing rule configured to include one or more facts in the revised natural language narrative regarding criteria met by the action causing the action to be categorized as an event of interest or the like; (iv) generate the revised natural language narrative by expanding or abstracting a fact type represented in the initial natural language narrative; and (v) generate the revised natural language narrative by changing an identity-, time- or entity-slice of a graph database model on which the initial natural language narrative was based.

The monitoring service may receive input from the supervisory user, such as selection of one or more of the above-listed options, make any corresponding change(s) to the system settings (e.g., to one or more of preference set(s) and/or structural narrative definition(s) corresponding to a user role, natural language processing rules, or the like stored for use or otherwise associated with the individual user), and generate the revised natural language narrative based at least in part based on the input from the supervisory user.

For example, the supervisory user may determine that the individual user's input(s) relating to the initial natural language narrative exhibit a lack of sophistication with respect to the event or action being described, and accordingly may provide corresponding supervisory user input requesting the monitoring service to revise or change the preference set(s) from which the initial natural language narrative was generated to reflect a user role and/or structural narrative definition(s) at a lower level of seniority or sophistication. Conversely, the supervisory user may, based on the individual user's input(s), request the monitoring service to revise or change the preference set(s) to increase the level of seniority and/or sophistication presumed by the monitoring service for generating the revised natural language narrative.

Such supervisory user input and/or corresponding change(s) may be kept confidential from the individual user, including following exposure of the revised natural language narrative to the individual user, thereby providing an obscured method for the supervisory user to tailor and periodically update the mechanisms driving generation of narratives for individual employee(s).

In accordance with the discussion above, generating the revised natural language narrative may include summarizing data extracted from the one or more pre-existing natural language narratives (e.g., from the initial natural language narrative). More particularly, generating the revised natural language narrative may include summarizing and/or abstracting a fact having a fact type from the initial natural language narrative. The abstraction may include representing a plurality of instances of occurrence of the fact type within the initial natural language narrative and the plurality of addition natural language narratives as a count in the revised natural language narrative, including as described above in connection with computer-implemented method 1000.

Conversely, generating the revised natural language narrative may include reducing the level of abstraction for a fact having a fact type relative to the information given in the initial natural language narrative. The reduced abstraction may include representing a count of occurrences set forth in the initial natural language narrative as a longer narrative elucidating and/or providing additional details regarding individual such occurrences and/or as a group of such narratives.

The revised natural language narrative may also or alternatively include or be constructed to change the initial natural language narrative with respect to one or more of the following: identity-based slices of the graph database model, time-based slices of the graph database model; and entity-based slices of the graph database model. Further, generating the revised natural language narrative may include executing an analyzer configured to analyze the action, the initial natural language narrative, the individual user input and/or supervisory user input, and any changes to system settings flowing from any of the foregoing and, based on the analysis, extract additional data from the network computing environment and add the additional data to the graph database model and/or to the revised natural language narrative.

Referring to step 1107, a representation of the revised natural language narrative may be exposed or provided to the individual user.

The step 1107 may be performed at the monitoring device and/or a client device, for example where the monitoring device transmits a representation of the revised natural language narrative to the client device associated with the individual user for viewing.

The step 1107 may be carried out in accordance with step(s) 802, 1005 and/or 1104 discussed in detail above. For example, the representation may include one or more links, and may be visual—such as where it comprises instructions for display of a visual window on a screen display as illustrated in FIG. 9B—or it may comprise a data structure for retrieval by, for example, a client device. In one or more embodiments, the representation is therefore a data structure configured for exposure to and access by a client device, e.g., where retrieval of the representation is enabled via an API responding to a call from the client device. However, it should be noted that step 1107 may occur independently of and/or may not be preceded by one or more of the steps outlined in connection with the computer-implemented methods 500, 600, 800 and/or 1000 without departing from the spirit of the present invention.

One of ordinary skill will appreciate that related functions or steps discussed above in connection with one or more of computer-implemented methods 500, 600, 800, 1000 may be executed or taken with the steps of the method 1100 within the scope of the present invention. One of ordinary skill will also appreciate that one or all steps of computer-implemented methods 500, 600, 800, 1000 may be excluded or omitted from the method 1100 without departing from the scope of the present invention.

It should be reiterated that a central goal of embodiments of the present invention is to provide a technological mechanism for improved intervention in the network computing environment. In one or more preferred embodiments, the mechanism is employed within network computing environments modeled on production graph database models and relying on natural language narratives for enhanced entity resolution. This presents an improved method for providing visibility into operation of resources within the network computing environment and the ability for owner(s) or others administrating or participating in utilization of monitoring service(s) to intervene in pre-determined and system-specific ways to preserve, for example, system integrity and security.

The method may include additional, less, or alternate steps and/or device(s), including those discussed elsewhere herein, unless otherwise expressly stated and/or readily apparent to those skilled in the art from the description. For example, machine learning techniques may be applied to the problem of determining how to change an initial natural language narrative to generate an improved revised natural language narrative, which may improve or lead to an increased role for automation of such changes.

The machine learning program(s) of the monitoring device may therefore recognize or determine correlations between, on the one hand, options and prompts offered to the individual user and/or the supervisory user, and/or implemented methods and mechanisms for generating revised natural language narratives, as discussed in more detail above and, on the other hand, one or more of selections of the individual user and/or the supervisory user and/or success metrics for the methods and mechanisms for generating revised natural language narratives.

The machine learning techniques or programs may include curve fitting, regression model builders, convolutional or deep learning neural networks, combined deep learning, pattern recognition, or the like. Based upon this data analysis, the machine learning program(s) may learn method(s) for generating improved revised natural language narratives.

It should be noted that, in supervised machine learning, the program may be provided with example inputs (i.e., individual user input) and their associated outputs (i.e., better or worse selection of methods and mechanisms for generating revised natural language narratives), and may seek to discover a general rule that maps inputs to outputs for improved construction of revised natural language narratives. In unsupervised machine learning, the program may be required to find its own structure in unlabeled example inputs.

The program may utilize classification algorithms such as Bayesian classifiers and decision trees, sets of pre-determined rules, and/or other algorithms to generate the correlations and insights discussed above.

ADDITIONAL CONSIDERATIONS

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein, unless otherwise expressly stated and/or readily apparent to those skilled in the art from the description.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The patent claims at the end of this patent application are not intended to be construed under 35 U.S.C. § 112(f) unless traditional means-plus-function language is expressly recited, such as "means for" or "step for" language being explicitly recited in the claim(s).

Although the invention has been described with reference to the embodiments illustrated in the attached drawing figures, it is noted that equivalents may be employed and substitutions made herein without departing from the scope of the invention as recited in the claims.

We claim:

1. Non-transitory computer-readable storage media having computer-executable instructions stored thereon for targeted narrative-structured representation of a network computing environment, wherein when executed by at least one processor the computer-executable instructions cause the at least one processor to:
    monitor the network computing environment;
    obtain, via the monitoring, data relating to an action performed in the network computing environment;
    associate an individual user with a user role of a plurality of user roles, the plurality of user roles respectively corresponding to a plurality of preference sets including a plurality of corresponding structural narrative definitions;
    based on the association, select a first preference set from among the plurality of preference sets, the first preference set including a first structural narrative definition of the plurality of structural narrative definitions;
    generate a first natural language narrative describing the action based on the first structural narrative definition; and
    expose or provide a representation of the first natural language narrative to the individual user.

2. The non-transitory computer-readable storage media of claim 1, wherein when executed by the at least one processor the computer-executable instructions further cause the at least one processor to—
    select a second preference set from the plurality of preference sets, the second preference set including a second structural narrative definition that is different than the first structural narrative definition;

generate a second natural language narrative describing the action based on the selected second structural narrative definition; and expose or provide a representation of the second natural language narrative to a second individual user assigned to the second preference set.

3. The non-transitory computer-readable storage media of claim 2, wherein the first structural narrative definition requires at least one of: (i) inclusion of a fact type in the first natural language narrative that is not required to be included in the second natural language narrative by the second structural narrative definition; (ii) abstraction of a fact in the first natural language narrative that is not required for the second natural language narrative by the second structural narrative definition; and (iii) attachment of an enabled action program to the first natural language narrative that is not required to be attached to the second natural language narrative by the second structural narrative definition.

4. The non-transitory computer-readable storage media of claim 1, wherein generating the first natural language narrative includes extracting at least some of the data relating to the action from one or more initial natural language narratives and summarizing the extracted data according to the first structural narrative definition.

5. The non-transitory computer-readable storage media of claim 4, wherein— the extracted data is from a plurality of the initial natural language narratives, the summarizing includes abstraction of a fact having a fact type from each of the plurality of the initial natural language narratives, the abstraction comprising representing a plurality of instances of occurrence of the fact type within the plurality of the initial natural language narratives as a count in the first natural language narrative.

6. The non-transitory computer-readable storage media of claim 1, wherein generating the natural language narrative includes extracting at least some of the data relating to the action from a graph database model representing the network computing environment.

7. The non-transitory computer-readable storage media of claim 6, wherein the first structural narrative definition requires that the extracted data be limited to one or more of the following: identity-based slices of the graph database model, time-based slices of the graph database model; and entity-based slices of the graph database model.

8. The non-transitory computer-readable storage media of claim 1, wherein the first structural narrative definition requires attachment of an enabled action program configured for execution via instruction by any user assigned to a first user role corresponding to the first preference set.

9. The non-transitory computer-readable storage media of claim 1, wherein when executed by the at least one processor the computer-executable instructions further cause the at least one processor to receive input from an individual administrative user that— enrolls a corresponding organization in a monitoring service comprising the monitoring, the organization having administrative rights within the network computing environment, identifies a plurality of employees of the organization including the individual user, the identification including: (i) provision of contact information for each of the plurality of employees, (ii) specification of one of a plurality of user roles for each of the plurality of employees, the plurality of user roles corresponding to the plurality of preference sets.

10. The non-transitory computer-readable storage media of claim 9, wherein— the plurality of user roles includes a second user role corresponding to a second structural narrative definition that is different than the first structural narrative definition, the specification of the second user role for a second employee of the plurality of employees includes indicating a subordinate position for the second employee relative to the individual user, the second structural narrative definition requires additional detail regarding a fact type relative to the first structural narrative definition.

11. A computer-implemented method for targeted narrative-structured representation of a network computing environment comprising, via one or more transceivers and/or processors:

monitoring the network computing environment;

obtaining, via the monitoring, data relating to an action performed in the network computing environment;

associating an individual user with a user role of a plurality of user roles, the plurality of user roles respectively corresponding to a plurality of preference sets including a plurality of corresponding structural narrative definitions;

based on the association, selecting a first preference set from among the plurality of preference sets, the first preference set including a first structural narrative definition of the plurality of structural narrative definitions;

generating a first natural language narrative describing the action based on the first structural narrative definition; and exposing or providing a representation of the first natural language narrative to the individual user.

12. The computer-implemented method of claim 11, further comprising, via the one or more transceivers and/or processors— selecting a second preference set from the plurality of preference sets, the second preference set including a second structural narrative definition that is different than the first structural narrative definition;

generating a second natural language narrative describing the action based on the second structural narrative definition; and exposing or providing a representation of the second natural language narrative to a second individual user assigned to the second preference set.

13. The computer-implemented method of claim 12, wherein the first structural narrative definition requires at least one of: (i) inclusion of a fact type in the first natural language narrative that is not required to be included in the second natural language narrative by the second structural narrative definition; (ii) abstraction of a fact in the first natural language narrative that is not required for the second natural language narrative by the second structural narrative definition; and (iii) attachment of an enabled action program to the first natural language narrative that is not required to be attached to the second natural language narrative by the second structural narrative definition.

14. The computer-implemented method of claim 11, wherein generating the first natural language narrative includes extracting at least some of the data relating to the action from one or more initial natural language narratives and summarizing the extracted data according to the first structural narrative definition.

15. The computer-implemented method of claim 14, wherein—
the extracted data is from a plurality of the initial natural language narratives,
the summarizing includes abstraction of a fact having a fact type from each of the plurality of the initial natural language narratives, the abstraction comprising representing a plurality of instances of occurrence of the fact type within the plurality of the initial natural language narratives as a count in the first natural language narrative.

16. The computer-implemented method of claim 11, wherein generating the natural language narrative includes extracting at least some of the data relating to the action from a graph database model representing the network computing environment.

17. The computer-implemented method of claim 16, wherein the first structural narrative definition requires that the extracted data be limited to one or more of the following: identity-based slices of the graph database model, time-based slices of the graph database model; and entity-based slices of the graph database model.

18. The computer-implemented method of claim 11, wherein the first structural narrative definition requires attachment of an enabled action program configured for execution via instruction by any user assigned to a first user role corresponding to the first preference set.

19. The computer-implemented method of claim 11, further comprising, via the one or more processors and/or transceivers, receiving input from an individual administrative user that—
enrolls a corresponding organization in a monitoring service comprising the monitoring, the organization having administrative rights within the network computing environment,
identifies a plurality of employees of the organization including the individual user, the identification including: (i) provision of contact information for each of the plurality of employees, (ii) specification of one of a plurality of user roles for each of the plurality of employees, the plurality of user roles corresponding to the plurality of preference sets.

20. The computer-implemented method of claim 19, wherein—
the plurality of user roles includes a second user role corresponding to a second structural narrative definition that is different than the first structural narrative definition,
the specification of the second user role for a second employee of the plurality of employees includes indicating a subordinate position for the second employee relative to the individual user,
the second structural narrative definition requires additional detail regarding a fact type relative to the first structural narrative definition.

\* \* \* \* \*